(12) United States Patent
Wang

(10) Patent No.: US 12,124,333 B2
(45) Date of Patent: Oct. 22, 2024

(54) TECHNIQUES FOR MEMORY ERROR CORRECTION

(71) Applicant: Micron Technology, Inc., Boise, ID (US)

(72) Inventor: Kai Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 77 days.

(21) Appl. No.: 17/939,801

(22) Filed: Sep. 7, 2022

(65) Prior Publication Data

US 2023/0039002 A1 Feb. 9, 2023

Related U.S. Application Data

(63) Continuation-in-part of application No. 17/877,210, filed on Jul. 29, 2022.

(60) Provisional application No. 63/228,816, filed on Aug. 3, 2021.

(51) Int. Cl.
G06F 11/10 (2006.01)
(52) U.S. Cl.
CPC .................. *G06F 11/1096* (2013.01)
(58) Field of Classification Search
None
See application file for complete search history.

(56) References Cited

U.S. PATENT DOCUMENTS

| | | | |
|---|---|---|---|
| 9,037,949 B1 | 5/2015 | Vogelsang et al. | |
| 10,936,209 B2 | 3/2021 | Prosser et al. | |
| 2012/0151299 A1* | 6/2012 | Suh | G11C 11/40615 |
| | | | 714/E11.002 |
| 2012/0317352 A1* | 12/2012 | Kang | G11C 29/52 |
| | | | 711/E12.001 |
| 2016/0202926 A1* | 7/2016 | Benedict | G06F 12/123 |
| | | | 711/106 |
| 2017/0060681 A1* | 3/2017 | Halbert | G06F 3/064 |
| 2019/0333566 A1* | 10/2019 | Kim | G11C 11/40603 |
| 2020/0341840 A1* | 10/2020 | Chang | G06F 13/1668 |

OTHER PUBLICATIONS

C. Chou, P. Nair and M. K. Qureshi, "Reducing Refresh Power in Mobile Devices with Morphable ECC," 2015 45th Annual IEEE/IFIP International Conference on Dependable Systems and Networks, Rio de Janeiro, Brazil, 2015, pp. 355-366, (Year: 2015).*

* cited by examiner

*Primary Examiner* — Daniel F. McMahon
(74) *Attorney, Agent, or Firm* — Holland & Hart LLP

(57) ABSTRACT

Methods, systems, and devices for techniques for memory error correction are described. A memory device operates in cycles associated with refresh operations and in cycles associated with refresh with error correction (ECC) operations independently. For example, the memory device includes an ECC patrol block having an error correction counter which indicates a row on which to perform an error correction procedure. Additionally, the memory device may include a refresh counter which indicates a row on which to perform a refresh operation. In response to receiving a command of a first type, the memory device modifies the error correction counter and maintains the refresh counter. Alternatively, in response to receiving a command of a second type, the memory device modifies the refresh counter and maintains the error correction counter.

25 Claims, 11 Drawing Sheets

TECHNIQUES FOR MEMORY ERROR CORRECTION

CROSS REFERENCE

The present application for patent is a continuation-in-part of and claims priority to and the benefit of U.S. patent application Ser. No. 17/877,210 by Wang, entitled "TECHNIQUES FOR MEMORY ERROR CORRECTION," filed 29 Jul. 2022, which claims the benefit of U.S. Provisional Patent Application No. 63/228,816 by Wang, entitled "TECHNIQUES FOR MEMORY ERROR CORRECTION," filed 3 Aug. 2021, each of which is assigned to the assignee hereof, and each of which is expressly incorporated by reference herein.

FIELD OF TECHNOLOGY

The following relates to one or more systems for memory, including techniques for memory error correction.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
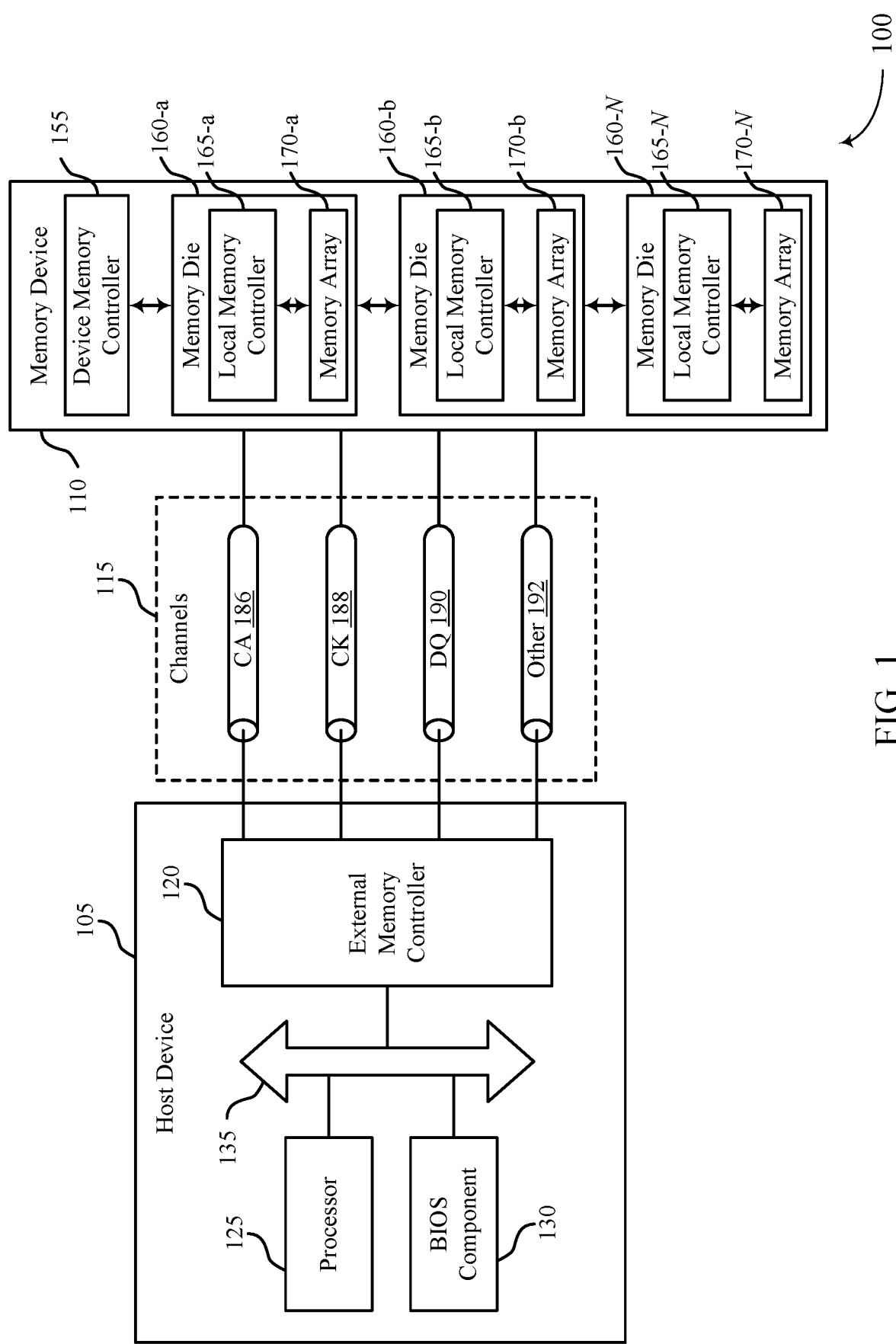
FIG. 1 illustrates an example of a system that supports techniques for memory error correction in accordance with examples as disclosed herein.

Data stored in a memory device (e.g., a dynamic random access memory (DRAM) device) may become corrupted over time, for example due to electromagnetic interference, high energy particles (e.g., cosmic rays), memory cell wear and aging, or other error mechanisms. Thus, stored data may in some cases come to include one or more errors, and data stored for a relatively long time may be more likely to contain multiple errors compared to data stored for a relatively short time. In some cases, a single-bit error (SBE) may be correctable, for example using a single-error correction (SEC) error correction code (ECC). However, SBEs that are not corrected may eventually become uncorrectable double-bit errors (DBEs) or other types of multi-bit errors, as after one bit within a set of data becomes corrupted, one or more additional bits within the set of data may subsequently also become corrupted. The disclosure herein may support correcting an SBE before it becomes a DBE or other type of multi-bit error. Further, though examples may be explained herein in the context of correcting SBEs before additional errors occur within a set of data subject to an error detection and correction procedure, it is to be understood that the teachings herein may further be extended to apply to detecting and correcting errors including any quantity of bits (e.g., DBEs) before they become errors including one or more additional bits.

A memory device may include an ECC block that stores parity bits for detecting errors, for example as part of an error correction operation. In some cases, the ECC block may correct errors during access operations, such as read or write operations. That is, the ECC block may perform error correction on data stored in a memory cell or group of memory cells as part of reading the data from or writing the data to the memory cell or group of memory cells. However, some portions of the memory device may not be accessed as often as other portions (i.e., some portions may be "cold", compared to more frequently accessed "hot" portions), and so SBEs in these portions of the memory device may be more likely to turn into DBEs before such data is accessed.

As described herein, a memory device may perform error correction as part of a refresh operation to periodically perform error correction on each portion of a memory device. For example, a host device may periodically transmit a refresh command with ECC (e.g., REF_wECC) that indicates an ECC check is to be performed, where the refresh with ECC command may be different from a refresh command (i.e., different from a refresh command performed without error correction). The memory device may include an ECC patrol block that includes an error control counter to indicate a portion of a row (i.e., a quantity of logical columns of the row) on which to perform error correction. In response to receiving the refresh with ECC command, the memory device may activate a row and perform error correction for the portion of the row to check and correct for errors. The ECC patrol block may also increment and reset the error control counter, so that the ECC block may perform error correction on each portion of each row of the memory device over the course of several refresh with ECC commands. Additionally or alternatively, the memory device may operate in a self-refresh mode, and may perform refresh operations, including the refresh with ECC operation as described herein, without receiving commands from the host system. While examples of the present disclosure may be described with reference to DRAM devices, the techniques described herein may be applied to any memory type.

In some cases, a memory device may include a refresh counter along with the error correction counter. The refresh counter may be configured to track cycles or refresh operations (among other information), such that if the memory device receives a refresh command, the memory device may increment the refresh counter and perform a refresh operation on a row indicated by the refresh counter. In some examples, a memory device may also increment the refresh counter in response to a command, such as a refresh with ECC command. Thus, cycles associated with refresh operations and cycles associated with error correction operations may be related to each other. Accordingly, the memory device and the host device may schedule quantities, timings, and orders of refresh commands and refresh with ECC commands, which may increase complexity and system overhead associated with performing error correction procedures.

As described herein, a memory device may operate cycles associated with refresh operations and cycles associated with refresh with ECC operations independently. For example, the memory device may include an ECC patrol block (e.g., module, component) having an error correction counter that indicates a row on which to perform an error correction procedure. Additionally or alternatively, the memory device may include a refresh counter that indicates a row on which to perform a refresh operation. In response to receiving a command of a first type (e.g., a refresh with ECC command), the memory device may modify the error correction counter and maintain the refresh counter (e.g., may not modify the refresh counter). Additionally or alternatively, in response to receiving a command of a second type (e.g., a refresh command), the memory device may modify the refresh counter and maintain the error correction counter (e.g., may not modify the error correction counter). Thus, the memory device may perform operations related to error correction procedures independently from refresh operations, among other advantages.

Features of the disclosure are initially described in the context of systems and dies as described with reference to FIGS. 1 and 2. Features of the disclosure are described in the context of systems, an apparatus diagram, and process flows as described with reference to FIGS. 3 through 8. These and other features of the disclosure are further illustrated by and described with reference to an apparatus diagram and flowcharts that relate to techniques for memory error correction as described with reference to FIGS. 9 through 10.

FIG. 1 illustrates an example of a system 100 that supports techniques for memory error correction in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may communicate information (e.g., data, commands, or both) with the host device 105. For example, the memory device 110 may receive a write command indicating that the memory device 110 is to store data received from the host device 105, or receive a read command indicating that the memory device 110 is to provide data stored in a memory die 160 to the host device 105, among other types of information communication.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some examples, the one or more other channels 192 may include one or more error detection code (EDC) channels. The EDC channels may be operable to communicate error detection signals, such as checksums, to improve system reliability. An EDC channel may include any quantity of signal paths.

The system 100 may include any quantity of non-transitory computer readable media that support techniques for memory error correction. For example, the host device 105, the device memory controller 155, or a memory device 110 may include or otherwise may access one or more non-transitory computer readable media storing instructions (e.g., firmware) for performing the functions ascribed herein to the host device 105, device memory controller 155, or memory device 110. For example, such instructions, if executed by the host device 105 (e.g., by the external memory controller 120), by the device memory controller 155, or by a memory device 110 (e.g., by a local controller 165), may cause the host device 105, device memory controller 155, or memory device 110 to perform associated functions as described herein.

In some cases, a memory die 160 may include an ECC block (i.e., an on-die ECC block) used for performing error correction operations (e.g., single error correction (SEC) operations) on data stored on the memory die 160. Errors, such as single bit errors (SBEs), may be introduced into the data from electromagnetic radiation, high-energy particles (e.g., from cosmic rays), memory cell wear and age, or a combination thereof, among other examples. If a set of data with a SBE develops one or more additional errors (i.e., a double bit error (DBE) or multiple bit error (MBE)), error correction operations such as SEC and SECDED may not be able to correct the DBE. Thus, it may be advantageous to correct SBEs relatively quickly, and thus mitigate the likelihood of developing DBEs. To correct SBEs, error correction operations may be performed on data during access operations (i.e., read or write operations). However, some regions of data in a memory array 170 may be accessed more frequently than other regions (i.e., some regions of data may be "hot", while other regions may be "cold"). Because cold regions of the memory array 170 are accessed relatively infrequently, the cold regions may be more susceptible to developing DBEs.

In some cases, a memory system 100 may prevent cold regions from developing DBEs or MBEs by periodically performing an access operation (e.g., a read operation) on each region of the memory array 170, thus preventing any region from becoming cold. However, periodically performing a read operation on each region of the memory array 170 may introduce system latency and power consumption, for example by consuming bandwidth resources used for communicating data between the host device 105 and the memory device 110. That is, the read operations used to prevent cold regions may prevent other operations from transferring data between the host device 105 and the memory device 110 during the read operation. For example, bandwidth resources consumed by read operations used to prevent cold regions may contribute to so-called page conflicts in which two immediately subsequent access operations (e.g., a read followed by a read or write, or a write followed by a read or write) may target different rows (i.e., pages) of the same bank. Such page conflicts cases lead to an increased quantity of row-switching commands and operations (e.g., activate and precharge commands and operations), which in return may degrade efficiency (e.g., overall bus efficiency).

In some examples, a memory system 100 may perform error correction as part of a refresh operation—e.g., in addition to or as an alternative to performing error correction as part of an access operation (e.g., a read or write operation). For example, the memory system 100 may be configured to support a refresh command, as well as a refresh with ECC command. The refresh command may cause a region of a memory array 170 (e.g., a row of a memory array 170) to be accessed and the read data written back to the region. Alternatively, a refresh with ECC command may cause the region of the memory array 170 to be accessed and, along with the read data being writing back to the region, may cause the ECC block to perform an error correction operation on the region or a portion of the region. In some cases, the host device 105 may be configured to issue the refresh command, the refresh with ECC command, or both, to the memory device 110. In other cases, the memory device 110 may initiate a refresh operation with ECC, for example as part of a self-refresh mode. A memory system 100 that supports the refresh with ECC command may reduce system latency and power consumption by preventing cold regions from developing multi-bit errors without consuming bandwidth resources used for communicating data between the host device 105 and the memory device 110.

In some cases, a memory device 110 may operate cycles associated with refresh operations and cycles associated with refresh with ECC operations independently. For example, the memory device 110 may include an ECC patrol block (e.g., module, component) having an error correction counter that indicates a row on which to perform an error correction procedure. Additionally, the memory device 110 may include a refresh counter that indicates a row on which to perform a refresh operation. In response to receiving a command of a first type (e.g., a refresh with ECC command), the memory device 110 may modify the error correction counter and maintain the refresh counter (e.g., may not modify the refresh counter). Additionally or alternatively, in response to receiving a command of a second type (e.g., a refresh command), the memory device 110 may modify the refresh counter and maintain the error correction counter (e.g., may not modify the error correction counter).

Figure 2:
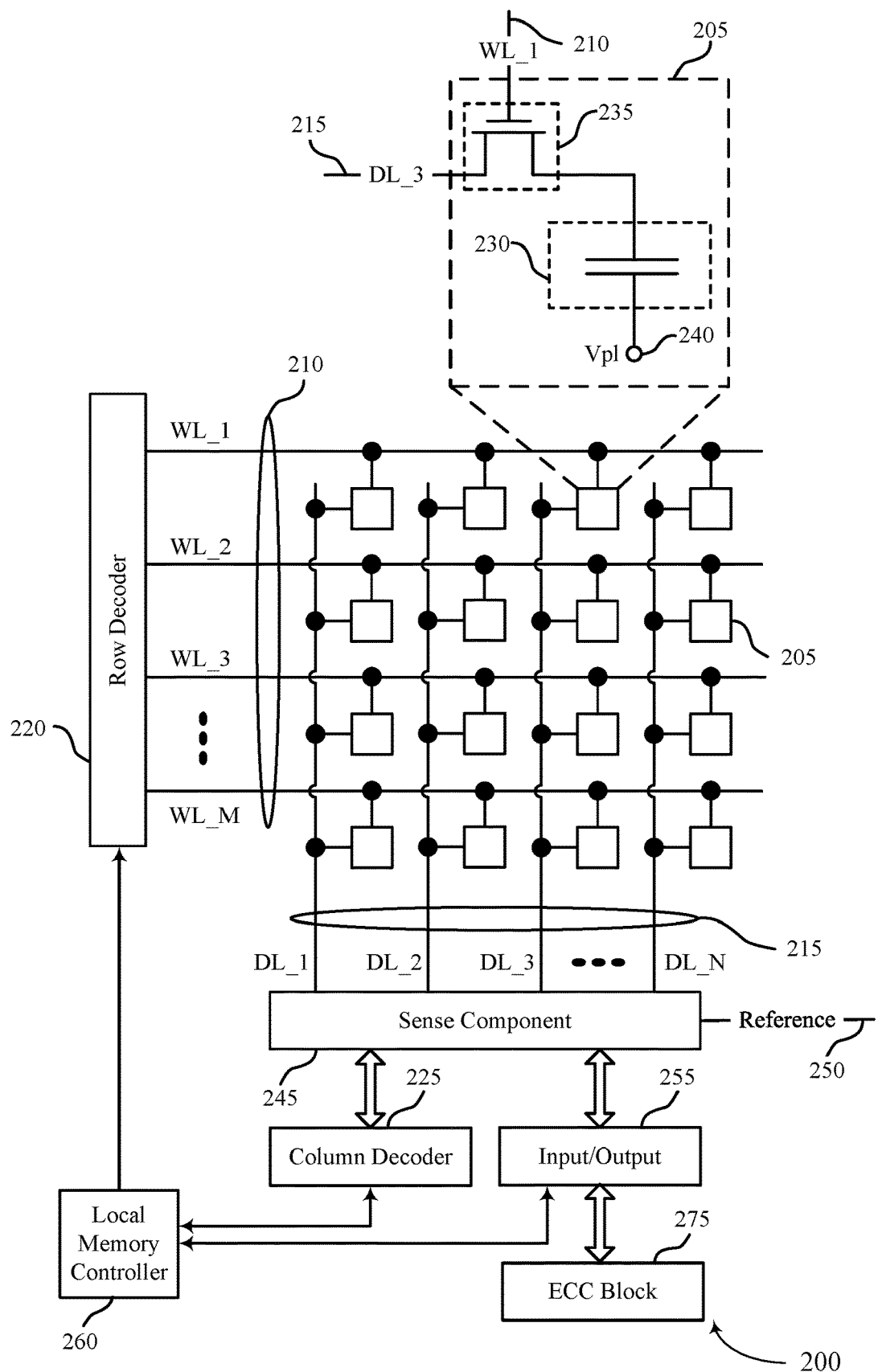
FIG. 2 illustrates an example of a memory die that supports techniques for memory error correction in accordance with examples as disclosed herein.

FIG. 2 illustrates an example of a memory die 200 that supports techniques for memory error correction in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state. The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on (e.g., using) that comparison, the sense component 245 may determine a logic state that is stored on the memory cell 205.

In some examples, a memory die 200 may be included as part of an automotive or other system that is safety sensitive, stability sensitive, or both. Errors, such as SBEs, may be introduced into the data stored in the memory die 200 from electromagnetic radiation, high-energy particles (e.g., from cosmic rays), memory cell wear and age, or a combination thereof, among other examples. If a set of data with a SBE develops one or more additional errors, such as DBEs or MBEs, error correction operations such as SEC and SECDED may not be able to correct the errors. Thus, it may be advantageous to correct SBEs relatively quickly, and thus mitigate the likelihood of developing DBEs.

In some cases, the memory die 200 may include an ECC block 275 (e.g., an on-die ECC) to perform error correction operations on data stored in the memory die 200, which may include error detection operations or capabilities. The ECC block 275 may perform error correction operations on data during access operations (i.e., read or write operations). However, some regions of data in the memory die 200 may be accessed more frequently than other regions (i.e., some regions of data may be "hot", while other regions may be "cold"). Because cold regions of the memory die 200 are accessed relatively infrequently, the cold regions may be more susceptible to developing DBEs or MBEs.

In some examples, the memory die 200 may perform error correction as part of a refresh operation—e.g., in the alternative or in addition to performing error correction as part of an access operation (e.g., a read or write operation). For example, the memory die 200 may be configured to support a refresh command, as well as a refresh with ECC command. Additionally or alternatively, the memory die 200 may support performing the refresh operation with ECC as part of a self-refresh mode. The refresh operation may cause a region of the memory die 200 (e.g., a row of memory cells 205) to be accessed and written back to the region. Alternatively, a refresh operation with ECC may cause the region of the memory array to be accessed and subsequently may cause the ECC block 275 to perform an error correction operation on the region or a portion of the region. A memory die 200 that supports the refresh with ECC operation may reduce system latency and power consumption by preventing cold regions from developing without consuming bandwidth resources used for communicating data between a host system and a memory device.

To perform error correction on a set of data, the ECC block 275 may be configured to generate, using a code or algorithm, a first set of one or more parity bits associated with the set of data. The first parity bits may be compared with a second set of parity bits which were generated, for example as part of or otherwise in connection with previously writing the set of data, using the same code or algorithm. If no errors have been introduced in the set of data, then the first parity bits and the second parity bits may match. Thus, the ECC block 275 may be configured to determine whether the set of data contains a data error by comparing the first parity bits with the second parity bits. In some cases, the ECC block 275 may be configured to correct SBEs detected during the error correction procedure, though ECC schemes supporting detection or correction of other quantities of errors in a set of data may alternatively be implemented by ECC block 275.

In some cases, a memory die 200 may operate cycles (e.g., one or more cycles) associated with refresh operations and cycles (e.g., one or more cycles) associated with refresh with ECC operations independently. For example, the memory die 200 may include an ECC patrol block (e.g., module, component) having an error correction counter that indicates a row on which to perform an error correction procedure. Additionally, the memory die 200 may include a refresh counter that indicates a row on which to perform a refresh operation. In response to receiving a command of a first type (e.g., a refresh with ECC command), the memory die 200 may modify the error correction counter and maintain the refresh counter (e.g., may not modify the refresh counter). Additionally or alternatively, in response to receiving a command of a second type (e.g., a refresh command), the memory die 200 may modify the refresh counter and maintain the error correction counter (e.g., may not modify the error correction counter).

Figure 3:
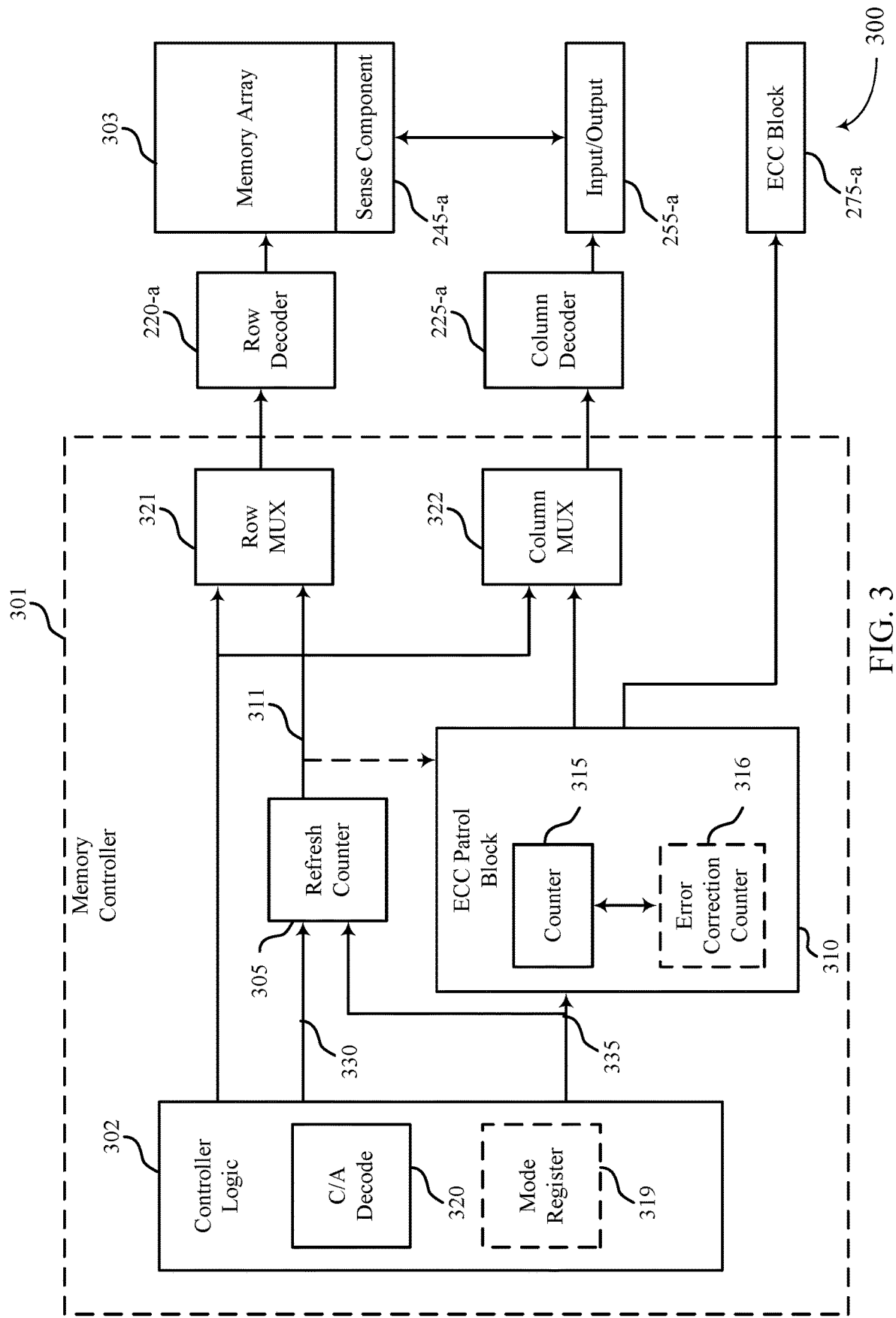
FIG. 3 illustrates an example of a system that supports techniques for memory error correction in accordance with examples as disclosed herein.

FIG. 3 illustrates an example of a system 300 that supports techniques for memory error correction in accordance with examples as disclosed herein. The system 300 may include a column decoder 225-a, a row decoder 220-a, an input/output 255-a, a sense component 245-a, and an ECC block 275-a, which may be examples of the corresponding devices described with reference to FIG. 2.

The system 300 may also include a memory controller 301, which may include aspects of a device memory controller or a local memory controller described with reference to FIGS. 1 and 2, and a memory array 303, which may include rows and columns of memory cells. The ECC block 275-a may perform an error correction procedure, such as an SEC operation, on portions of the memory array 303. For example, the ECC block 275-a may check a first portion of a row for data errors in connection with a refresh operation, and refrain from checking a second portion of the row for data errors in connection with the refresh operation. The memory controller 301 may include a controller logic component 302 configured to receive or process commands, such as refresh commands, from a host device. The commands may be decoded by a command/address (C/A) decode component 320. For example, the C/A decode component 320 may be configured to determine whether a command is a refresh command or a refresh with ECC command. The memory controller 301 may also include a row multiplexer (MUX) 321 and a column MUX 322, which may be configured to issue row and column addresses to the row decoder 220-*a* and the column decoder 225-*a* as part of, for example, a refresh operation. The refresh operation may include accessing a row of the memory array 303 and refreshing the data stored in the row (e.g., writing the data stored in the row back to the row).

The memory controller 301 may include a refresh counter 305, which may be configured to track and store a value associated with a quantity of refresh operations performed at the memory array 303 (e.g., since a most recent reset of the refresh counter 305). The refresh counter 305 may indicate an address of a row or set of rows to be refreshed to the row MUX 321, which may in turn indicate the row or set of rows to be refreshed to the row decoder 220-*a* and the memory array 303. For example, upon receiving a refresh indication 330 from the controller logic component 302, the refresh counter 305 may issue to the row MUX 321 an indication 311 of the row or set of rows to be refreshed based on (e.g., using) the value of the refresh counter 305, and the value of the refresh counter 305 may be modified (e.g., incremented). In some cases, the value of the refresh counter 305 may be reset (e.g., reset to zero) if the modified value thereof would exceed the quantity of rows in the memory array 303 or the counter otherwise reaches a threshold value or rolls over. For example, after refreshing each row of the memory array 303, the refresh counter 305 may be reset (e.g., to an initial value). Thus, upon receiving a quantity of refresh indications 330 equal to the quantity of rows of the memory array 303 (or set of rows for refresh purposes), each row of the memory array 303 may be refreshed.

The memory controller may also include an ECC patrol block 310. The ECC patrol block 310 may include a counter 315, which may indicate a portion of a row on which error correction is to be performed. For example, the counter 315 may indicate an address of one or more logical columns of the row on which error correction is to be performed. The quantity of logical columns included in the portion of the row (i.e., a granularity with which the row is divided into portions for ECC patrol purposes, which may correspond to how many portions into which the row is divided) may be configured using a command, through firmware, or through user input, among other examples. In some examples, the portion of a row may correspond to a quantity of columns from which a burst of data is to be read, and may be referred to as a pre-fetch unit. In other examples, the portion of the row may include the entire row of the memory array 303, or any quantity of logical columns of the memory array 303. The ECC patrol block 310 may issue an indication of the portion of the row to the column MUX 322 and the ECC block 275-*a*. The column MUX 322 may, in response to the indication, issue the indication to the column decoder 225-*a*, which may issue the indication to the input/output 255-*a*, where the input/output 255-*a* may be configured to select the portion of the row from the sense component 245-*a*, and issue the portion of the row to the ECC block 275-*a*. The counter 315 may be reset upon reaching a threshold—e.g., once a value of the counter 315 corresponds to a last row portion (e.g., last set of columns) within the memory array 303, a next incrementing of the counter 315 may cause the value of the counter to reset (e.g., roll over).

The ECC block 275-*a* may perform error correction on the portion of the row, and issue the results (e.g., an indication of any corrected bits corrected as a result of the error correction) to the memory array as part of the refresh operation (i.e., via the input/output 255-*a* and the sense component 245-*a*). That is, the ECC block 275-*a* may determine whether the portion of the row includes a data error (e.g., an SBE) and, in some examples, correct the data error in the portion of the row. To identify and correct errors in a portion of the row, the ECC block 275-*a* may generate one or more parity bits for the portion of the row and compare the parity bits with parity bits corresponding to the portion of the row that have been previously stored.

The counter 315 may store and increment a value indicating the portion of the row upon which the ECC block 275-*a* is to perform error correction (i.e., an address counter or column counter). For example, the memory cells of each row of the memory array 303 may be grouped into a quantity of units (e.g., portions of the row, such as pre-fetch units), which may be indexed, where the indices correspond to possible values of the counter 315.

In some examples, upon receiving a refresh with ECC indication 335, the ECC patrol block 310 may also receive an indication 311 of the value of the refresh counter 305, and the ECC patrol block 310 may be configured to increment the counter 315 based on the value of the refresh counter 305 (e.g., based on the refresh counter 305 being reset). Additionally or alternatively, the ECC patrol block 310 may be configured to increment the counter 315 based on the quantity of refresh with ECC indications 335 received. For example, the ECC patrol block may include an error correction counter 316, which may be configured to be incremented each time a refresh with ECC indication 335 is received, and the ECC patrol block 310 may be configured to increment the counter 315 based on the value of the error correction counter 316 (e.g., based on the error correction counter 316 being reset).

The quantity of refresh with ECC indications 335 issued per refresh indication 330 may be managed by one or both of the host device and the system 300. For example, a refresh with ECC indication 335 may be issued once per period, where the period may represent a quantity of refresh indications 330. In some cases, the period may be a quantity p of refresh cycles, where a refresh cycle may be the quantity of refresh operations used to refresh each row of the memory array 303. Thus, for example, p multiplied by the quantity of refresh operations in a refresh cycle (e.g., p multiplied by a quantity of refresh operations used to refresh each row of the memory array 303 one time) may correspond to (e.g., equal) a quantity of regular refresh operations performed in between each successive refresh with ECC operation. In some other cases, the period may be a quantity p of refresh indications 330 (e.g., for every two refresh indications 330, one refresh with ECC indication 335 may be issued). Thus, a period may in some cases be a fraction of a refresh cycle.

In some cases, the host device may send refresh commands to the system 300, for example as part of an auto-refresh mode. In such cases, the host device may include a refresh handler, which may be configured to manually or automatically adjust the quantity p. Additionally or alternatively, the system 300 may operate using a self-refresh mode, in which the system 300 performs refresh operations without receiving a refresh command from the host device. If operating in a self-refresh mode, the system 300 may include a mode register 319 used to store the quantity p, and may determine the period during a self-refresh operation. In some cases, such as upon a self-refresh entry or self-refresh exit, one refresh with ECC indication 335 may be issued. That is, a refresh with ECC indication 335 may executed by the system 300 or by a refresh handler within a host device upon entering the self-refresh mode and upon exiting the self-refresh mode.

In some examples, the ECC patrol block 310 may increment the value of the counter 315 in response to the refresh counter 305 being reset (i.e., reset to zero) or otherwise reaching some threshold. If a refresh with ECC is performed on each row of the memory array 303 successively (e.g., if p is zero), then resetting the refresh counter in such fashion may cause the counter 315 to be reset upon performing the error correction operation on the last (e.g., end) portion of the final row. That is, if the value of the counter 315 corresponds to the last (e.g., end) portion of the row and the refresh counter 305 is then reset, the counter 315 may be reset, and where p is zero, this may mean that refresh with ECC has most recently been performed on the last portion of the final row.

If, however, some quantity of regular refresh operations are performed between successive refresh with ECC operations (e.g., p has a non-zero value), then incrementing the counter 315 in response to the refresh counter 305 being reset (i.e., set to zero) or otherwise reaching some threshold may cause the counter 315 to be reset upon performing the error correction operation on the last (e.g., end) portion of any row. For example, if two regular refresh operations are performed between successive refresh with ECC operations, a refresh with ECC operation may be performed on the end portion of one of the two rows preceding the final row, then the refresh counter 305 may be reset based on a regular refresh operation corresponding to the final row, and hence a next refresh with ECC operation may be performed on a first portion of the first or second row of the memory array 303.

In some examples, the counter 315 may be incremented in response to refresh with ECC being performed on a certain portion (e.g., corresponding to particular portion index) of all rows of the memory array 303 (e.g., once refresh with ECC has been performed on the first portion of each row of the memory array, the counter 315 may be incremented, and then once refresh with ECC has been performed on the second portion of each row of the memory array, the counter 315 may again be incremented, and so on). For example, if the counter 315 is incremented in response to the error correction counter 316 being reset, then the counter 315 may not increment until refresh with ECC has been performed on a certain portion (e.g., a group of columns) across all rows of the memory array 303. If the value of p is zero, this may cause refresh with ECC to be performed sequentially across all rows of the memory array 303 within each successive portion. If, however, the value of p is non-zero, this may cause refresh with ECC to be performed across the rows of the memory array 303 within a given portion in non-sequential fashion (e.g., the row being refreshed may change based on the separate incrementing of the refresh counter 305, but the value of the counter 315—and hence the portion subject to refresh with ECC—may not change until the error correction counter 316 resets).

By incrementing the value of the refresh counter 305 and the counter 315 (and the error correction counter 316, if present) as described herein, the ECC block 275-a may perform error correction on each portion of each row of the memory array 303 over time.

Figure 4:
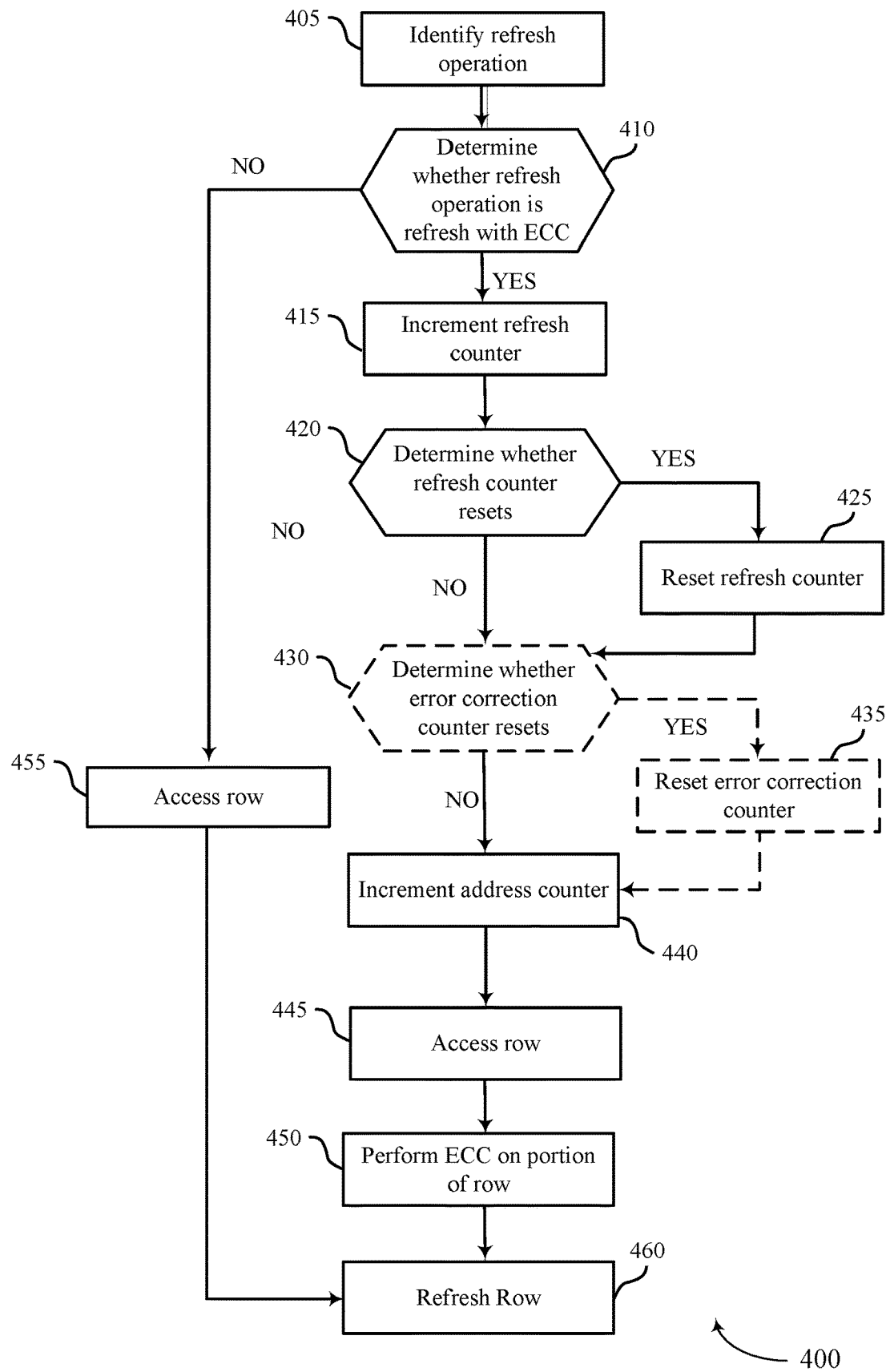
FIG. 4 illustrates an example of a process flow that supports techniques for memory error correction in accordance with examples as disclosed herein.

FIG. 4 illustrates an example of a process flow 400 that supports techniques for memory error correction in accordance with examples as disclosed herein. The process flow 400 may be performed by components of a memory system, such as a controller (e.g., a memory controller 301 as described with reference to FIG. 3), which may include an ECC patrol block (e.g., the ECC patrol block 310). Additionally or alternatively, aspects of the process flow 400 may be implemented as instructions stored in memory (e.g., firmware stored in a memory coupled with a device memory controller 155 or a local memory controller 165 described with reference to FIG. 1). For example, the instructions, if executed by a controller (e.g., a device memory controller 155 or a local controller 165), may cause the controller to perform the operations of the process flow 400. In the following description of process flow 400, the operations may be performed in a different order than the order shown. For example, specific operations may also be left out of process flow 400, or other operations may be added to process flow 400.

At 405, a refresh operation may be identified. For example, the memory controller may receive an external refresh command from a host device to refresh a row of a memory array. Additionally or alternatively, the memory controller may be operating in a self-refresh mode, and the memory controller may be configured to issue refresh indications for the memory array.

In some cases, the memory system may identify a refresh with ECC operation as part of identifying the refresh operation. For example, a refresh with ECC indication may be issued, either based on a refresh with ECC command received from the host device or based on a mode register at the memory controller. In some examples, the refresh with ECC indication may be issued based on a periodicity, as described with reference to FIG. 3. Thus, at 410, it may be determined whether the refresh operation identified at 405 is a refresh with ECC operation. For example, the memory controller may determine whether the refresh operation is associated with a refresh command or a refresh with ECC command received from the host device.

In some cases, it may be determined that the refresh operation is a refresh with ECC operation. In such cases, at 415, a refresh counter (e.g., the refresh counter 305 as described with reference to FIG. 3) may be incremented. For example, in response to identifying the refresh operation at 405, the memory controller may increment the value of the refresh counter to indicate a row of the memory array to be refreshed, as described with reference to FIG. 3.

At 420, it may be determined whether to reset to refresh counter. For example, the value of the refresh counter may exceed the quantity of rows of the memory array, indicating that the refresh operation identified at 405 corresponds to a first row of the memory array (i.e., a previous refresh operation may have refreshed the last row of the memory array). Thus, by comparing the value of the refresh counter to a threshold, such as the quantity of rows of the memory device, the value of the refresh counter may be reset at 425. That is, in response to determining that the refresh counter exceeds the threshold, the memory controller may reset the refresh counter.

Optionally, at 430, it may be determined whether to reset an error correction counter (e.g., the error correction counter 316 of the ECC patrol block 310 as described with reference to FIG. 3) at the ECC patrol block. For example, if the error correction counter exceeds a threshold, such as the quantity of rows in the memory array, the ECC patrol block may reset (i.e., set to zero) the error correction counter at 435.

At 440, an address counter (e.g., the counter 315 of the ECC patrol block 310 as described with reference to FIG. 3) may be incremented. For example, the memory controller may increment the address counter in response to the refresh counter being reset at 425. The address counter may identify a portion of the row of memory cells, for example as described with reference to FIG. 3.

At 445, a row may be accessed. For example, the memory controller may access a row indicated by the value of the refresh counter of the memory controller. Using the value of the address counter and, in some cases, the error correction counter, the memory controller may issue an indication to an ECC block (e.g., the ECC block 275-*a* as described with reference to FIG. 3) of a portion of the accessed row on which to perform an error correction operation.

At 450, ECC may be performed on a portion of the row accessed at 445. For example, the ECC block 275-*a* may perform error correction, such as a SEC operation, on the portion of the row indicated by the refresh counter and the address counter. The error correction may include generating one or more parity bits for the portion of the row and compare the parity bits with parity bits corresponding to the portion of the row that have been previously stored. That is, the ECC block may check a first portion of a row for data errors in connection with a refresh operation, and refrain from checking a second portion of the row for data errors in connection with the refresh operation.

Additionally or alternatively, it may be determined at 410 that the refresh operation is not a refresh with ECC operation. In such cases, at 455, a row may be accessed. For example, the memory controller may access a row indicated by the value of the refresh counter of the memory controller and write back data of the row (e.g., as part of a refresh operation at 460).

At 460, the row may be refreshed. For example, the memory controller may refresh the row of the memory array indicated by the refresh counter by writing back the data of row after accessing the row. In some cases (i.e., if error correction has been performed), writing back the data may include writing back the data that has been corrected as part of the error correction procedure at 450.

Aspects of the process flow 400 may be implemented by a controller, among other components. Additionally or alternatively, aspects of the process flow 400 may be implemented as instructions stored in memory (e.g., firmware stored in a memory coupled with a memory system). For example, the instructions, executed by a controller (e.g., an external memory controller 120, a device memory controller 155, a local memory controller 260, or a combination thereof), may cause the controller to perform the operations of the process flow 400.

Figure 5:
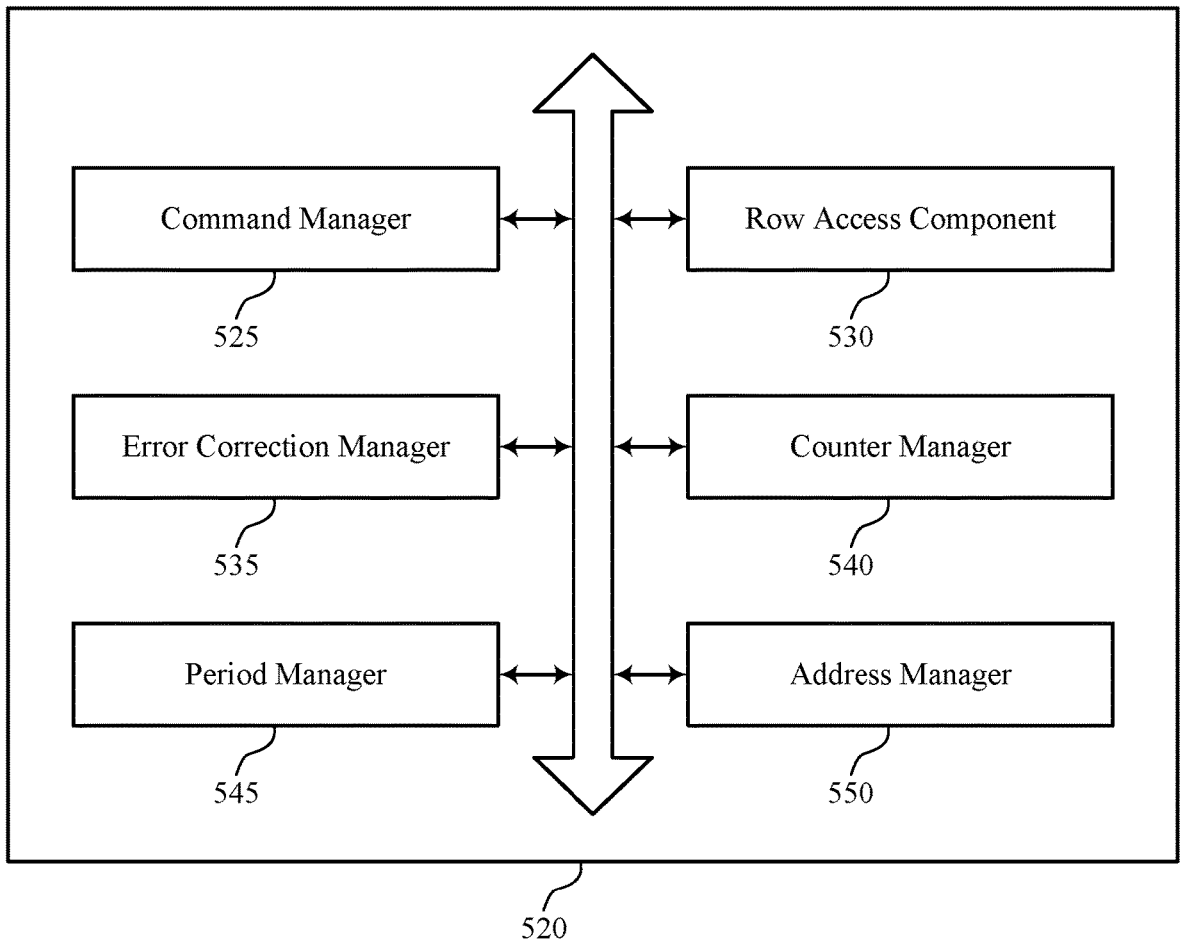
FIG. 5 illustrates an example of a block diagram of a memory device that supports techniques for memory error correction in accordance with examples as disclosed herein.

FIG. 5 illustrates an example of a block diagram 500 that supports techniques for memory error correction in accordance with examples as disclosed herein. The memory device 520 may be an example of aspects of a memory device as described with reference to FIGS. 1 through 4. The memory device 520, or various components thereof, may be an example of means for performing various aspects of techniques for memory error correction as described herein. For example, the memory device 520 may include a command manager 525, a row access component 530, an error correction manager 535, a counter manager 540, a period manager 545, an address manager 550, or any combination thereof. Each of these components may communicate, directly or indirectly, with one another (e.g., via one or more buses).

The command manager 525 may be configured as or otherwise support a means for identifying, at a memory system, a refresh operation for a row of memory cells within a memory array. The row access component 530 may be configured as or otherwise support a means for accessing the row of memory cells within the memory array in response to identifying the refresh operation. The error correction manager 535 may be configured as or otherwise support a means for determining whether the row includes a data error based at least in part on accessing the row in response to identifying the refresh operation. In some examples, the error correction manager 535 may be configured as or otherwise support a means for correcting the data error using an error correction procedure based at least in part on determining that the row includes the data error.

In some examples, the counter manager 540 may be configured as or otherwise support a means for incrementing a value of a refresh counter in response to identifying the refresh operation, where accessing the row of memory cells is based at least in part on the value of the refresh counter.

In some examples, the refresh counter is configured to be reset to an initial value based at least in part on the value of the refresh counter satisfying a threshold, and the counter manager 540 may be configured as or otherwise support a means for incrementing a value of an address counter based at least in part on the value of the refresh counter being reset to the initial value. In some examples, the refresh counter is configured to be reset to an initial value based at least in part on the value of the refresh counter satisfying a threshold, and the address manager 550 may be configured as or otherwise support a means for accessing at least a portion of data in the row based at least in part on the value of the address counter, where determining whether the row includes the data error includes determining whether at least the portion of data in the row includes the data error based at least in part on accessing at least the portion of data.

In some examples, the counter manager 540 may be configured as or otherwise support a means for incrementing a value of an error correction counter in response to identifying the refresh operation, where the error correction counter is configured to be reset to an initial value based at least in part on the value of the error correction counter satisfying a threshold. In some examples, the counter manager 540 may be configured as or otherwise support a means for incrementing a value of an address counter based at least in part on the value of the error correction counter being reset to the initial value. In some examples, the row access component 530 may be configured as or otherwise support a means for accessing at least a portion of data in the row based at least in part on the value of the address counter, where determining whether the row includes the data error includes determining whether at least the portion of data in the row includes the data error based at least in part on accessing at least the portion of data.

In some examples, the command manager 525 may be configured as or otherwise support a means for receiving a first refresh command, where identifying the refresh operation is based at least in part on receiving the first refresh command. In some examples, the command manager 525 may be configured as or otherwise support a means for identifying the first refresh command as a first type of refresh command, where determining whether the row includes the data error is in response to identifying the first refresh command as the first type of refresh command.

In some examples, the command manager 525 may be configured as or otherwise support a means for receiving a second refresh command. In some examples, the command manager 525 may be configured as or otherwise support a means for identifying the second refresh command as a second type of refresh command different than the first type of refresh command. In some examples, the error correction manager 535 may be configured as or otherwise support a means for refraining from performing a second error detection procedure in response to the second refresh command based at least in part on identifying the second refresh command as the second type of refresh command.

In some examples, the period manager 545 may be configured as or otherwise support a means for identifying a periodicity associated with checking for data errors in connection with refresh operations, the periodicity corresponding to a quantity of intervening refresh operations without error detection between refresh operations with error detection, where determining whether the row includes the data error based at least in part on the periodicity.

In some examples, the period manager 545 may be configured as or otherwise support a means for identifying the periodicity based at least in part on a value stored at a memory device.

In some examples, the error correction manager 535 may be configured as or otherwise support a means for determining whether the row includes the data error in response to identifying the refresh operation based at least in part on the refresh operation being an initial refresh operation of a set of self-refresh operations, a final refresh operation of the set of self-refresh operations, an initial refresh operation of a set of commanded refresh operations, or a final refresh operation of the set of commanded refresh operations.

In some examples, the address manager 550 may be configured as or otherwise support a means for determining an address associated with a portion of data in the row based at least in part on a value of an address counter, where accessing the row of memory cells includes accessing the portion of data. In some examples, the error correction manager 535 may be configured as or otherwise support a means for generating one or more parity bits for the portion of data based at least in part on accessing the portion of data. In some examples, the error correction manager 535 may be configured as or otherwise support a means for comparing the one or more generated parity bits for the portion of data with one or more parity bits previously stored for the portion of data, where determining whether the row includes the data error is based at least in part on the comparing.

In some examples, the row access component 530 may be configured as or otherwise support a means for refreshing the row of memory cells as part of the refresh operation, where determining whether the row includes the data error further includes. In some examples, the error correction manager 535 may be configured as or otherwise support a means for checking a first portion of the row for data errors in connection with the refresh operation. In some examples, the error correction manager 535 may be configured as or otherwise support a means for refraining from checking a second portion of the row for data errors in connection with the refresh operation.

In some examples, the row access component 530 may be configured as or otherwise support a means for identifying a size of the first portion of the row based at least in part on a value stored at a memory device.

In some examples, to support determining whether the row includes the data error, the error correction manager 535 may be configured as or otherwise support a means for performing a single error correction (SEC) procedure for at least a portion of data stored in the row.

Figure 6:
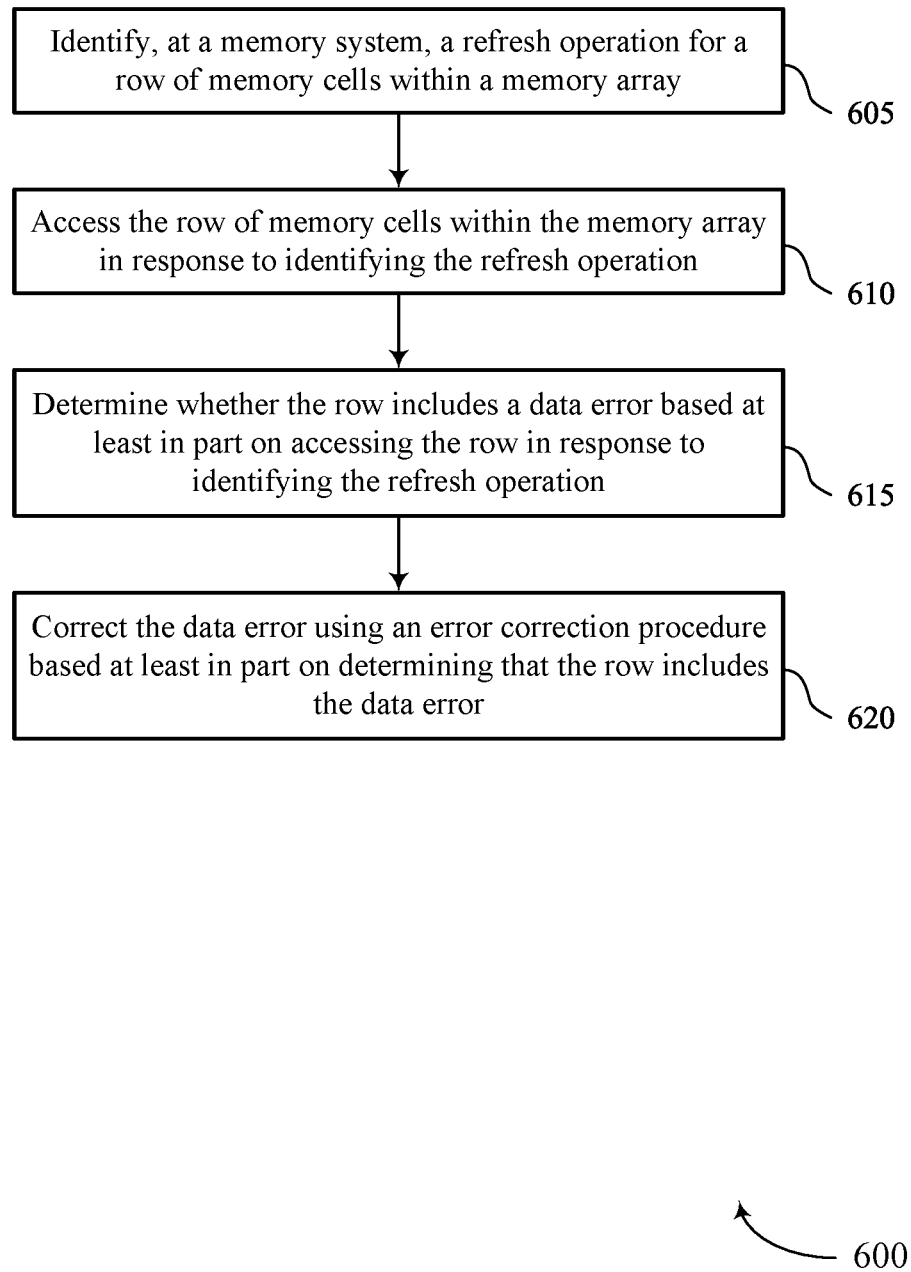
FIG. 6 illustrates an example of a flowchart that supports techniques for memory error correction in accordance with examples as disclosed herein.

FIG. 6 illustrates an example of a flowchart illustrating a method 600 that supports techniques for memory error correction in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 605, the method may include identifying, at a memory system, a refresh operation for a row of memory cells within a memory array. The operations of 605 may be performed in accordance with examples as disclosed herein. In some examples, aspects of the operations of 605 may be performed by a command manager 525 as described with reference to FIG. 5.

At 610, the method may include accessing the row of memory cells within the memory array in response to identifying the refresh operation. The operations of 610 may be performed in accordance with examples as disclosed herein. In some examples, aspects of the operations of 610 may be performed by a row access component 530 as described with reference to FIG. 5.

At 615, the method may include determining whether the row includes a data error based at least in part on accessing the row in response to identifying the refresh operation. The operations of 615 may be performed in accordance with examples as disclosed herein. In some examples, aspects of the operations of 615 may be performed by an error correction manager 535 as described with reference to FIG. 5.

At 620, the method may include correcting the data error using an error correction procedure based at least in part on determining that the row includes the data error. The operations of 620 may be performed in accordance with examples as disclosed herein. In some examples, aspects of the operations of 620 may be performed by an error correction manager 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for identifying, at a memory system, a refresh operation for a row of memory cells within a memory array, accessing the row of memory cells within the memory array in response to identifying the refresh operation, determining whether the row includes a data error based at least in part on accessing the row in response to identifying the refresh operation, and correcting the data error using an error correction procedure based at least in part on determining that the row includes the data error.

Some examples of the method 600 and the apparatus described herein may further include operations, features, circuitry, logic, means, or instructions for incrementing a value of a refresh counter in response to identifying the refresh operation, where accessing the row of memory cells may be based at least in part on the value of the refresh counter.

In some examples of the method 600 and the apparatus described herein, the refresh counter may be configured to be reset to an initial value based at least in part on the value of the refresh counter satisfying a threshold, and the method, apparatuses, and non-transitory computer-readable medium may include further operations, features, circuitry, logic, means, or instructions for incrementing a value of an address counter based at least in part on the value of the refresh counter being reset to the initial value and for accessing at least a portion of data in the row based at least in part on the value of the address counter, where determining whether the row includes the data error includes determining whether at least the portion of data in the row includes the data error based at least in part on accessing at least the portion of data.

Some examples of the method 600 and the apparatus described herein may further include operations, features, circuitry, logic, means, or instructions for incrementing a value of an error correction counter in response to identifying the refresh operation, where the error correction counter may be configured to be reset to an initial value based at least in part on the value of the error correction counter satisfying a threshold, incrementing a value of an address counter based at least in part on the value of the error correction counter being reset to the initial value, and accessing at least a portion of data in the row based at least in part on the value of the address counter, where determining whether the row includes the data error includes determining whether at least the portion of data in the row includes the data error based at least in part on accessing at least the portion of data.

Some examples of the method 600 and the apparatus described herein may further include operations, features, circuitry, logic, means, or instructions for receiving a first refresh command, where identifying the refresh operation may be based at least in part on receiving the first refresh command, and identifying the first refresh command as a first type of refresh command, where determining whether the row includes the data error may be in response to identifying the first refresh command as the first type of refresh command.

Some examples of the method 600 and the apparatus described herein may further include operations, features, circuitry, logic, means, or instructions for receiving a second refresh command, identifying the second refresh command as a second type of refresh command different than the first type of refresh command, and refraining from performing a second error detection procedure in response to the second refresh command based at least in part on identifying the second refresh command as the second type of refresh command.

Some examples of the method 600 and the apparatus described herein may further include operations, features, circuitry, logic, means, or instructions for identifying a periodicity associated with checking for data errors in connection with refresh operations, the periodicity corresponding to a quantity of intervening refresh operations without error detection between refresh operations with error detection, where determining whether the row includes the data error is based at least in part on the periodicity.

Some examples of the method 600 and the apparatus described herein may further include operations, features, circuitry, logic, means, or instructions for identifying the periodicity based at least in part on a value stored at a memory device.

Some examples of the method 600 and the apparatus described herein may further include operations, features, circuitry, logic, means, or instructions for determining whether the row includes the data error in response to identifying the refresh operation based at least in part on the refresh operation being an initial refresh operation of a set of self-refresh operations, a final refresh operation of the set of self-refresh operations, an initial refresh operation of a set of commanded refresh operations, or a final refresh operation of the set of commanded refresh operations.

Some examples of the method 600 and the apparatus described herein may further include operations, features, circuitry, logic, means, or instructions for determining an address associated with a portion of data in the row based at least in part on a value of an address counter, where accessing the row of memory cells includes accessing the portion of data, generating one or more parity bits for the portion of data based at least in part on accessing the portion of data, and comparing the one or more generated parity bits for the portion of data with one or more parity bits previously stored for the portion of data, where determining whether the row includes the data error may be based at least in part on the comparing.

Some examples of the method 600 and the apparatus described herein may further include operations, features, circuitry, logic, means, or instructions for refreshing the row of memory cells as part of the refresh operation, where determining whether the row includes the data error includes checking a first portion of the row for data errors in connection with the refresh operation, and refraining from checking a second portion of the row for data errors in connection with the refresh operation.

Some examples of the method 600 and the apparatus described herein may further include operations, features, circuitry, logic, means, or instructions for identifying a size of the first portion of the row based at least in part on a value stored at a memory device.

In some examples of the method 600 and the apparatus described herein, operations, features, circuitry, logic, means, or instructions for determining whether the row includes the data error may include operations, features, circuitry, logic, means, or instructions for performing an SEC procedure for at least a portion of data stored in the row.

In some examples of the method 600 and the apparatus described herein, operations, features, circuitry, logic, means, or instructions for determining whether the row includes the data error may include operations, features, circuitry, logic, means, or instructions for performing a single error correction (SEC) procedure for at least a portion of data stored in the row.

Figure 7:
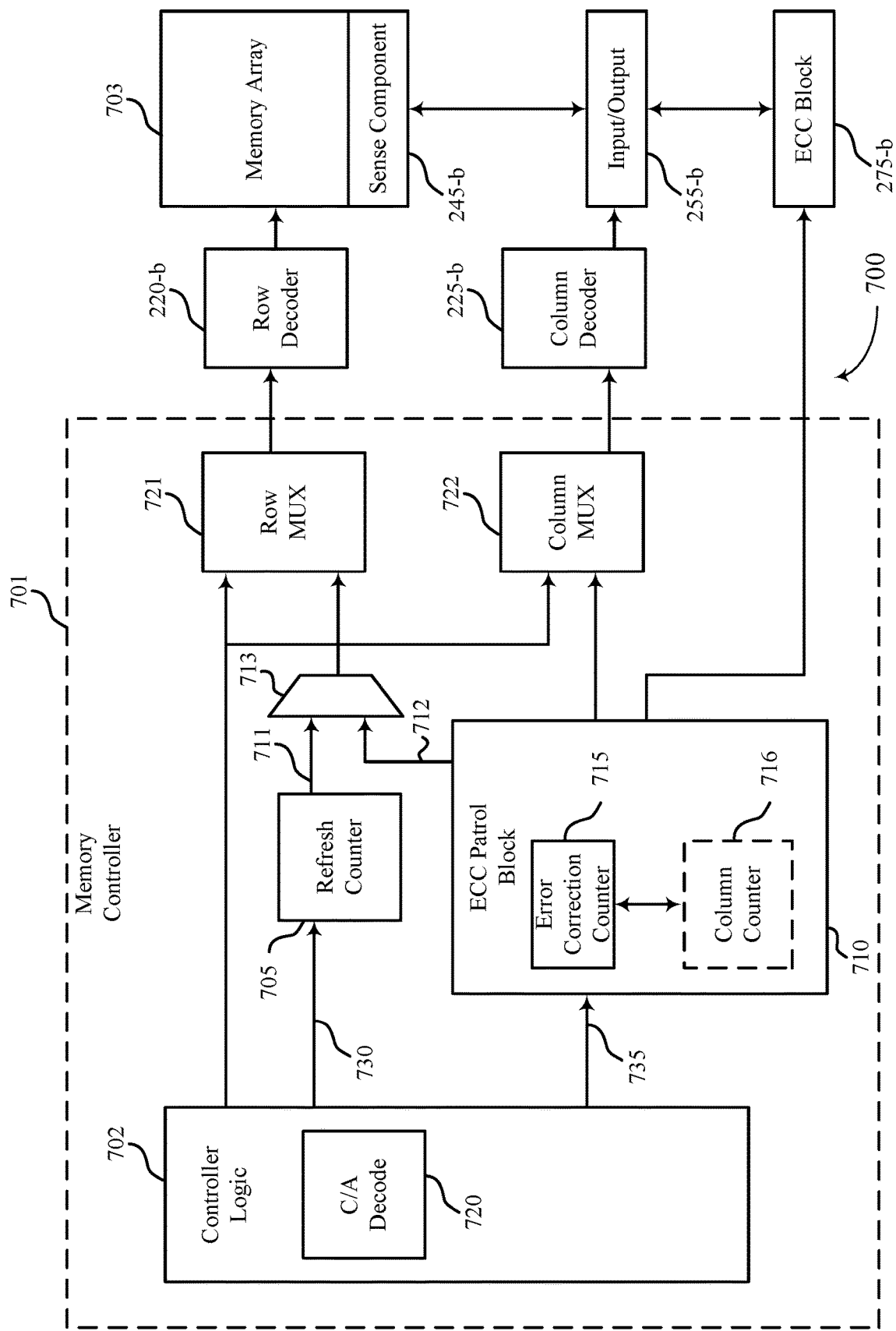
FIG. 7 illustrates an example of a system that supports techniques for memory error correction in accordance with examples as disclosed herein.

FIG. 7 illustrates an example of a system 700 that supports techniques for memory error correction in accordance with examples as disclosed herein. The system 700 may include a column decoder 225-*b*, a row decoder 220-*b*, an input/output 255-*b*, a sense component 245-*b*, and an ECC block 275-*b*, which may be examples of the corresponding devices described with reference to FIGS. 2 and 3, among others.

The system 700 may also include a memory controller 701, which may include aspects of a device memory controller or a local memory controller described with reference to FIGS. 1 and 2, and a memory array 703, which may include rows and columns of memory cells. The ECC block 275-*b* may perform an error correction procedure, such as an SEC operation, on portions of the memory array 703. For example, the ECC block 275-*b* may check a first portion of a row for data errors, and refrain from checking a second portion of the row for data errors. The memory controller 701 may include a controller logic 702 configured to receive or process commands, such as refresh commands and refresh with ECC commands, from a host device. The commands may be decoded by a command/address (C/A) decode component 720. For example, the C/A decode component 720 may be configured to determine whether a command is a refresh command or a refresh with ECC command. The memory controller 701 may also include a row MUX 721 and a column MUX 722, which may be configured to issue row and column addresses to the row decoder 220-*b* and the column decoder 225-*b* as part of a memory operation, such as a refresh operation or an error correction operation. The operation may include accessing a row of the memory array 303 and refreshing the data stored in the row (e.g., writing the data stored in the row back to the row), and in some cases may include performing an error correction operation on at least a portion of the data stored in the row.

The memory controller 701 may include a refresh counter 705, which may be configured to track and store a value associated with a quantity of refresh operations performed at the memory array 703 (e.g., since a most recent reset of the refresh counter 705). The refresh counter 705 may indicate an address of a row or set of rows to be refreshed to the row MUX 721, which may in turn indicate the row or set of rows to be refreshed to the row decoder 220-b and the memory array 303. For example, upon receiving a refresh indication 730 from the controller logic 702, the refresh counter 705 may issue to the row MUX 721 an indication 711 of the row or set of rows to be refreshed based on (e.g., using) the value of the refresh counter 705, and the value of the refresh counter 705 may be modified (e.g., incremented). In some cases, the value of the refresh counter 705 may be reset (e.g., reset to zero) if the modified value thereof would exceed the quantity of rows in the memory array 703, or the counter otherwise reaches a threshold value (e.g., a preconfigured threshold, a threshold set by a host device or a memory device, or rolls over past a set value. For example, after refreshing each row of the memory array 703, the refresh counter 705 may be reset (e.g., to a set value or an initial value). Thus, upon receiving a quantity of refresh indications 730 equal to the quantity of rows of the memory array 703 (or set of rows for refresh purposes), each row of the memory array 703 may be refreshed.

The memory controller may also include an ECC patrol block 710. The ECC patrol block 710 may be an example of a module or a component. The ECC patrol block 710 may include an error correction row counter 715, which may indicate a row on which error correction is to be performed. For example, a value of the error correction row counter 715 may indicate an address of one or more rows on the memory array 703 on which error correction is to be performed. The ECC patrol block 710 may issue an indication 712 of the row to the row MUX 721 and, in some cases, to the ECC block 275-b. The row MUX 721 may, in response to the indication 712, issue the indication to the row decoder 220-b, which may issue the indication to the memory array 703, and the value of the error correction row counter 715 may be modified (e.g., incremented). In some examples, the error correction row counter 715 may be reset upon reaching a threshold—e.g., once a value of the error correction row counter 715 corresponds to a last row within the memory array 703, a next modifying (e.g., incrementing) of the counter 715 may cause the value of the counter to reset (e.g., roll over).

In some examples, the ECC patrol block 710 may further include a column counter 716 that may indicate a portion of a row on which error correction is to be performed. For example, the column counter 716 may indicate an address of one or more logical columns of the row on which error correction is to be performed (e.g., the value of the column counter 716 may be an example of a pointer, such as a column pointer). The quantity of logical columns included in the portion of the row (i.e., a granularity with which the row is divided into portions for ECC patrol purposes, which may correspond to how many portions into which the row is divided) may be configured using a command, through firmware, or through user input, among other examples. In some examples, the portion of a row may correspond to a quantity of columns from which a burst of data is to be read, and may be referred to as a pre-fetch unit. In other examples, the portion of the row may include the entire row of the memory array 703, or any quantity of logical columns of the memory array 703. The ECC patrol block 710 may issue an indication of the portion of the row to the column MUX 722 and the ECC block 275-b. The column MUX 722 may, in response to the indication, issue the indication to the column decoder 225-b, which may issue the indication to the input/output 255-b, where the input/output 255-b may be configured to select the portion of the row from the sense component 245-b, and issue the portion of the row to the ECC block 275-b. The column counter 716 may be reset upon reaching a threshold—e.g., once a value of the column counter 716 corresponds to a last row portion (e.g., last set of columns) within the memory array 703, a next incrementing of the column counter 716 may cause the value of the column counter 716 to reset (e.g., roll over).

The ECC block 275-b may perform error correction on the portion of the row, and issue the results (e.g., an indication of any corrected bits corrected as a result of the error correction) to the memory array as part of the operation (i.e., via the input/output 255-b and the sense component 245-b). That is, the ECC block 275-b may determine whether the portion of the row includes a data error (e.g., an SBE) and, in some examples, correct the data error in the portion of the row. To identify and correct errors in a portion of the row, the ECC block 275-b may generate one or more parity bits for the portion of the row and compare the parity bits with parity bits corresponding to the portion of the row that have been previously stored. Then errors can be identified in the portion of the row based on any differences.

In some examples, the ECC patrol block 710 and the refresh counter 705 may not share information, such as indications of the value of the refresh counter 705 and the value of the error correction row counter 715. That is, operations performed by the system 700 in response to an indication of a refresh operation 730 may be separate from (e.g., independent from) operations performed by the system 700 in response to an indication of a refresh with ECC operation 735. For example, if the controller logic 702 issues the indication of the refresh operation 730 to the refresh counter 705, the refresh counter 705 may be modified (e.g., incremented), while the ECC patrol block 710 may maintain the value of the error correction row counter 715 (e.g., may not increment the error correction row counter 715). Additionally or alternatively, if the controller logic 702 issues the indication of the refresh operation with ECC 735 to the ECC patrol block 710, the error correction row counter 715 may be modified (e.g., incremented), while the refresh counter 705 may be maintained (e.g., may not be incremented). Accordingly, cycles associated with refresh operations may be separate or independent from cycles associated with error correction procedures.

The memory controller may include a MUX 713, which may be configured to select between the indication 711 from the refresh counter 705 and the indication 712 from the ECC patrol block 710. For example, if the controller logic 702 has issued a refresh indication 730 to the refresh counter, the MUX 713 may be configured to select the indication 711 and issue the indication of the row or set of rows to be refreshed to the row decoder 220-b. Additionally or alternatively, if the controller logic 702 has issued a refresh with ECC indication 735 to the ECC patrol block 710, the MUX 713 may be configured to select the indication 712 and issue the indication of the row or set of rows on which to perform an error correction procedure to the row decoder 220-b.

In some examples, upon receiving a refresh with ECC indication 735, the ECC patrol block 710 may be configured to modify the error correction row counter 715, for example by incrementing the value of the error correction row counter 715 to indicate another address, such as a next address (e.g., a next row), on which to perform an error correction procedure. The ECC patrol block 710 may further be configured to, in response to the refresh with ECC indication 735, issue an indication of the value of the error correction counter 716 to the row MUX 721 (e.g., via the MUX 713) and an indication of the value of the column counter 716 to the column MUX 722. Accordingly, ECC block 275-*b* may access the row indicated by the value or the error correction counter 715 and may perform an error correction procedure on the portion of the row indicated by the value of the column counter 716.

In some examples, upon receiving a refresh with ECC indication 735, the error correction counter 715 may reset (e.g., if the value of the error correction counter 715 reaches a threshold). In such cases, in response to resetting the error correction counter 715, the value of the column counter 716 may be modified. For example, the value of the column counter 716 may be incremented to indicate another column (e.g., a next column) or another portion (e.g., a next portion) of a row on which an error correction procedure is to be performed.

Accordingly, in some examples, after performing an error correction procedure on a same first column in each row of the memory array 703, the ECC block 275-*b* may perform an error correction procedure on a same second column (e.g., a next column) in each row of the memory array 703, and so on, such that, after the controller logic 702 issues an appropriate quantity of refresh with ECC indications 735, the ECC block 275-*b* may perform an error correction procedure on each column in each row of the memory array 703. Thus, the system 700 may allow for error correction on data stored in the memory array 703 without moving data between the system 700 and an external system, such as a host device or an SoC.

In some cases, because cycles associated with refresh operations may be separate from (e.g., independent from) cycles associated with error correction procedures, the host device may not coordinate transmitting refresh commands and refresh with ECC commands. Additionally or alternatively, the system 700 may operate using a low power mode or self-refresh mode, in which the system 700 may perform refresh operations and refresh with error correction operations without receiving a refresh command or a refresh with ECC command from the host device. Because the system 700 may perform the refresh with error correction operations without receiving an associated command, the system 700 may perform the refresh with error correction operations while in the low power mode, which may reduce power consumption (e.g., compared with performing the refresh with error correction operations by transitioning out of the low power mode). Accordingly, complexity associated with scheduling the sequence of refresh commands and refresh with ECC commands may be reduced.

Figure 8:
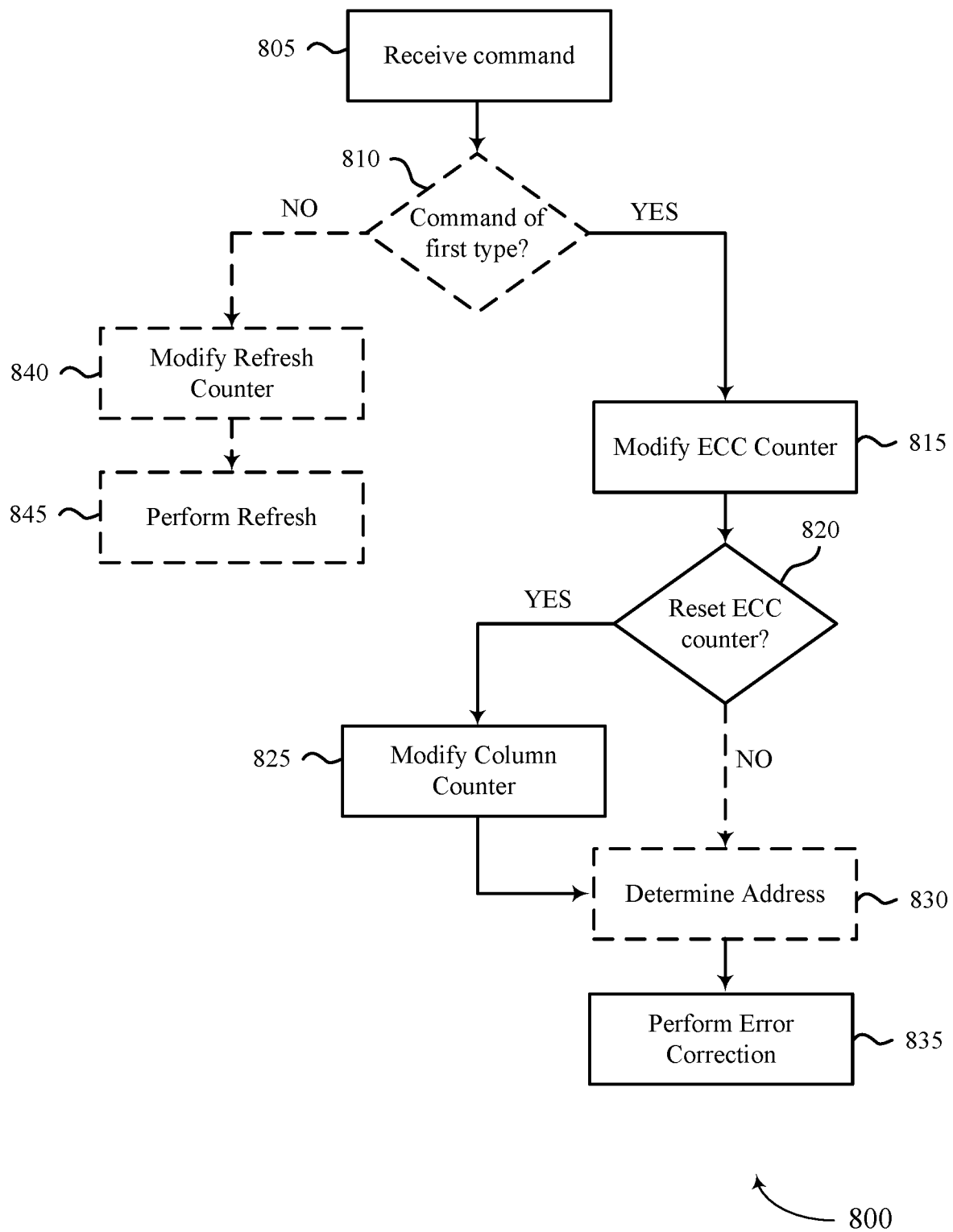
FIG. 8 illustrates an example of a process flow that supports techniques for memory error correction in accordance with examples as disclosed herein.

FIG. 8 illustrates an example of a process flow 800 that supports techniques for memory error correction in accordance with examples as disclosed herein. The process flow 800 may be performed by components of a memory system, such as a controller (e.g., a memory controller 701 as described with reference to FIG. 7), which may include an ECC patrol block (e.g., the ECC patrol block 710). Additionally or alternatively, aspects of the process flow 800 may be implemented as instructions stored in memory (e.g., firmware stored in a memory coupled with a device memory controller 155 or a local memory controller 165 described with reference to FIG. 1). For example, the instructions, if executed by a controller (e.g., a device memory controller 155 or a local controller 165), may cause the controller to perform the operations of the process flow 800. In the following description of process flow 800, the operations may be performed in a different order than the order shown. For example, specific operations may also be left out of process flow 800, or other operations may be added to process flow 800.

At 805, a command may be received. For example, the memory device may receive a command, such as a refresh command or a refresh with ECC command as described with reference to FIG. 7, from a host device. Additionally or alternatively, the memory controller of the memory device may be operating in a self-refresh mode or a low power mode, and thus the memory controller may be configured to issue commands, such as refresh commands or refresh with ECC commands, for the memory array. For example, the memory device may receive an indication to enter a low power mode. If the memory device is in the low power mode, the memory controller may issue commands, such as refresh commands and refresh with ECC commands, without receiving an external command from the host device.

In some cases, at 810, it may be determined whether the command received at 805 is of a first type. For example, the memory system may identify the command as a refresh with ECC command (e.g., a first type of command), or a refresh command (e.g., a second type of command), or some other command.

In some cases, at 815 and in response to determining that the command is of the first type at 810, an error correction counter may be modified. For example, the memory controller may issue an indication of the command to the ECC patrol block, and the ECC patrol block may modify the value of the error correction counter (e.g., may increment the value to indicate another row such as a next row). Because the command may be of the first type, the memory controller may not issue an indication to a refresh counter, and accordingly the value of the refresh counter may be maintained (e.g., may not be incremented or otherwise modified).

As described in greater detail with reference to FIG. 7, the value of the error correction counter may correspond to an address of a row on which to perform an error correction operation. Accordingly, modifying the value of the error correction counter may cause the value to meet or exceed a threshold quantity, such as the total quantity of rows of the memory array. Thus, at 820, it may be determined whether to adjust a value of (e.g., reset) to error correction counter. For example, ECC patrol block may compare the value of the error correction counter to a threshold, such as the total quantity of rows of the memory array. If the value meets or exceeds the threshold (e.g., is equal to or greater than the threshold), the ECC patrol block may reset the error correction counter, for example by setting the value to an initial value, such as zero or a value associated with a starting row of the memory array.

At 825 and in response to determining to reset the error correction counter, a value of a column counter may be modified. For example, as part of resetting the error correction counter, the ECC patrol block may modify the value of the column counter (e.g., may increment the value to point to a next column or next portion). As described in greater detail with reference to FIG. 7, the value of the column counter may correspond to an address of a portion of a row on which to perform an error correction operation. Accordingly, modifying the value of the column counter may cause the value to meet or exceed a threshold quantity, such as the total quantity of columns or portions of a row of the memory array. Thus, if the value of the column counter meets or exceeds (e.g., is equal to or greater than, satisfies) the threshold quantity, the ECC patrol block may reset the column counter.

In some cases, at 830, an address may be determined. For example, the ECC patrol block may issue an indication of the value of the error correction counter to a row decoder (e.g., the row decoder 220-*b*), and in some cases, the ECC patrol block may issue an indication of the column counter to a column decoder (e.g., the column decoder 225-*b*). Accordingly, the row decoder may determine an address of a row on which to perform error correction, and the column decoder may determine an address of a portion of the row on which to perform error correction.

At 835, an error correction procedure may be performed. For example, an ECC block of the memory device (e.g., the ECC block 275-*b*) may access the portion of the row of the memory array indicated by the address determined at 830. Upon receiving data stored in the portion of the row, the ECC block may perform the error correction procedure, such as an SEC operation, on the data stored in the portion. The error correction may include generating one or more parity bits for the portion of the row and comparing the parity bits with parity bits corresponding to the portion of the row that have been previously stored. That is, the ECC block may check a first portion of a row for one or more data errors, and refrain from checking a second portion of the row for data errors.

In some examples, the command received at 805 may be of the second type. For example, the command may be a refresh command. In such cases, at 840 and in response to determining that the command is of the second type at 810, the refresh counter may be modified. For example, the memory controller may issue an indication of the command to the refresh counter, and the memory controller may modify the value of the refresh counter (e.g., may increment the value to indicate a next row). Because the command may be of the second type, the memory controller may not issue an indication to the ECC patrol block, and accordingly the value of the error correction counter may be maintained (e.g., may not be incremented or otherwise modified).

At 845, a refresh operation may be performed. For example, the refresh counter may issue an indication of a row on which to perform the refresh operation to the row decoder, and the memory controller may refresh the row of the memory array indicated by the refresh counter by writing back the data of row after accessing the row. In some cases Aspects of the process flow 800 may be implemented by a controller, among other components. Additionally or alternatively, aspects of the process flow 800 may be implemented as instructions stored in memory (e.g., firmware stored in a memory coupled with a memory system). For example, the instructions, executed by a controller (e.g., an external memory controller 120, a device memory controller 155, a local memory controller 260, or a combination thereof), may cause the controller to perform the operations of the process flow 400.

Figure 9:
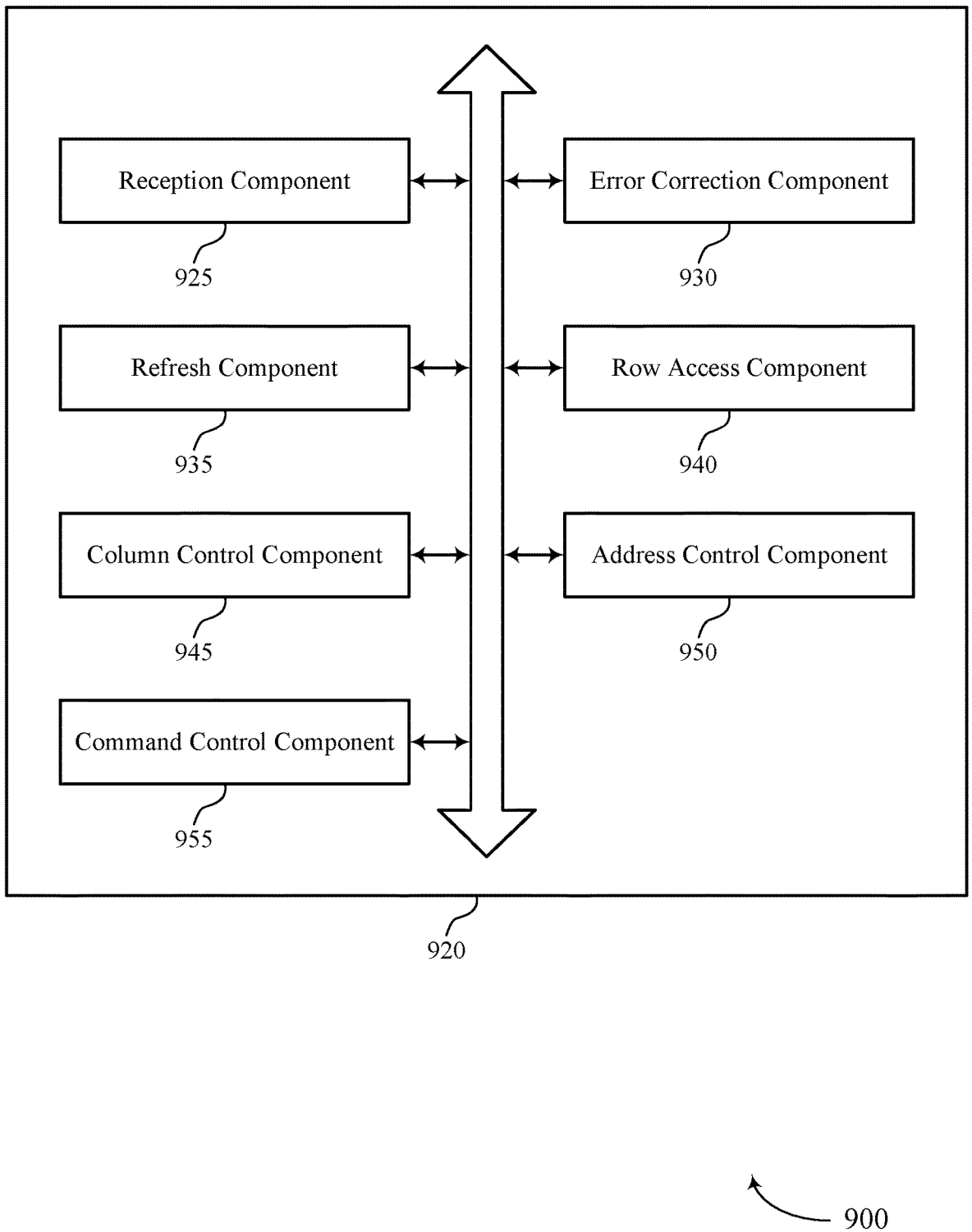
FIG. 9 shows a block diagram of a memory device that supports techniques for memory error correction in accordance with examples as disclosed herein.

FIG. 9 shows a block diagram 900 of a memory device 920 that supports techniques for memory error correction in accordance with examples as disclosed herein. The memory device 920 may be an example of aspects of a memory device as described with reference to FIGS. 1 through 8. The memory device 920, or various components thereof, may be an example of means for performing various aspects of techniques for memory error correction as described herein. For example, the memory device 920 may include a reception component 925, an error correction component 930, a refresh component 935, a row access component 940, a column control component 945, an address control component 950, a command control component 955, or any combination thereof. Each of these components may communicate, directly or indirectly, with one another (e.g., via one or more buses).

The reception component 925 may be configured as or otherwise support a means for receiving, at a memory device, a first command of a first type for a memory array of the memory device. The error correction component 930 may be configured as or otherwise support a means for modifying a value of an error correction counter in response to receiving the first command of the first type. The refresh component 935 may be configured as or otherwise support a means for maintaining a value of a refresh counter in response to receiving the first command. In some examples, the error correction component 930 may be configured as or otherwise support a means for performing an error correction procedure on a portion of a first row of the memory array based at least in part on the value of the error correction counter.

In some examples, the reception component 925 may be configured as or otherwise support a means for receiving a second command of a second type. In some examples, the refresh component 935 may be configured as or otherwise support a means for modifying the value of the refresh counter in response to receiving the second command of the second type. In some examples, the error correction component 930 may be configured as or otherwise support a means for maintaining the value of the error correction counter based at least in part on the second command being the second type. In some examples, the refresh component 935 may be configured as or otherwise support a means for performing a refresh operation on a second row of the memory array based at least in part on the value of the refresh counter.

In some examples, the value of the refresh counter corresponds to an address for the second row.

In some examples, to support maintaining the refresh counter, the refresh component 935 may be configured as or otherwise support a means for maintaining the refresh counter based at least in part on the first type being a refresh with error correction command.

In some examples, the column control component 945 may be configured as or otherwise support a means for determining, based at least in part on modifying the value of the error correction counter, whether the value of the error correction counter satisfies a threshold. In some examples, the column control component 945 may be configured as or otherwise support a means for modifying a value of a column counter based at least in part on determining that the value of the error correction counter satisfies the threshold, where the portion of the first row is based at least in part on the value of the column counter.

In some examples, the error correction component 930 may be configured as or otherwise support a means for resetting the value of the error correction counter based at least in part on determining that the value of the error correction counter satisfies the threshold.

In some examples, to support performing the error correction procedure, the address control component 950 may be configured as or otherwise support a means for determining an address associated with the portion of first row based at least in part on a value of a column counter. In some examples, to support performing the error correction procedure, the row access component 940 may be configured as or otherwise support a means for accessing the first row based at least in part on determining the address. In some examples, to support performing the error correction procedure, the error correction component 930 may be configured as or otherwise support a means for generating one or more parity bits for the portion based at least in part on accessing the first row. In some examples, to support performing the error correction procedure, the error correction component 930 may be configured as or otherwise support a means for comparing the one or more parity bits for the portion with one or more parity bits previously stored for the portion.

In some examples, the column control component 945 may be configured as or otherwise support a means for determining a size of the portion of the first row based at least in part on a value stored at the memory device.

In some examples, the reception component 925 may be configured as or otherwise support a means for receiving a command to transition to a low power mode for the memory device. In some examples, the command control component 955 may be configured as or otherwise support a means for issuing, during at least a portion of the low power mode, a second command of the first type from a memory controller of the memory device to the memory array.

In some examples, the value of the error correction counter corresponds to an address for the first row.

In some examples, the error correction procedure includes a single error correction (SEC) procedure.

In some examples, the reception component 925 may be configured as or otherwise support a means for receiving, at a memory device, a first command of a first type for a memory array of the memory device. In some examples, the error correction component 930 may be configured as or otherwise support a means for modifying a value of an error correction counter in response to receiving the first command of the first type. The row access component 940 may be configured as or otherwise support a means for accessing a first row of the memory array, an address of the first row based at least in part on the value of the error correction counter. In some examples, the error correction component 930 may be configured as or otherwise support a means for resetting the value of the error correction counter based at least in part on determining whether the value of the error correction counter satisfies a threshold. The column control component 945 may be configured as or otherwise support a means for modifying a value of a column counter based at least in part on determining that the value of the error correction counter satisfies the threshold.

In some examples, the error correction component 930 may be configured as or otherwise support a means for performing an error correction operation on a portion of the first row, an address of the portion of the first row based at least in part on the value of the column counter.

In some examples, the reception component 925 may be configured as or otherwise support a means for receiving a second command of a second type. In some examples, the refresh component 935 may be configured as or otherwise support a means for modifying a value of a refresh counter in response to receiving the second command of the second type. In some examples, the error correction component 930 may be configured as or otherwise support a means for maintaining the value of the error correction counter based at least in part on the second command being the second type. In some examples, the refresh component 935 may be configured as or otherwise support a means for performing a refresh operation on a second row of the memory array based at least in part on the value of the refresh counter.

In some examples, the value of the refresh counter corresponds to an address for the second row.

Figure 10:
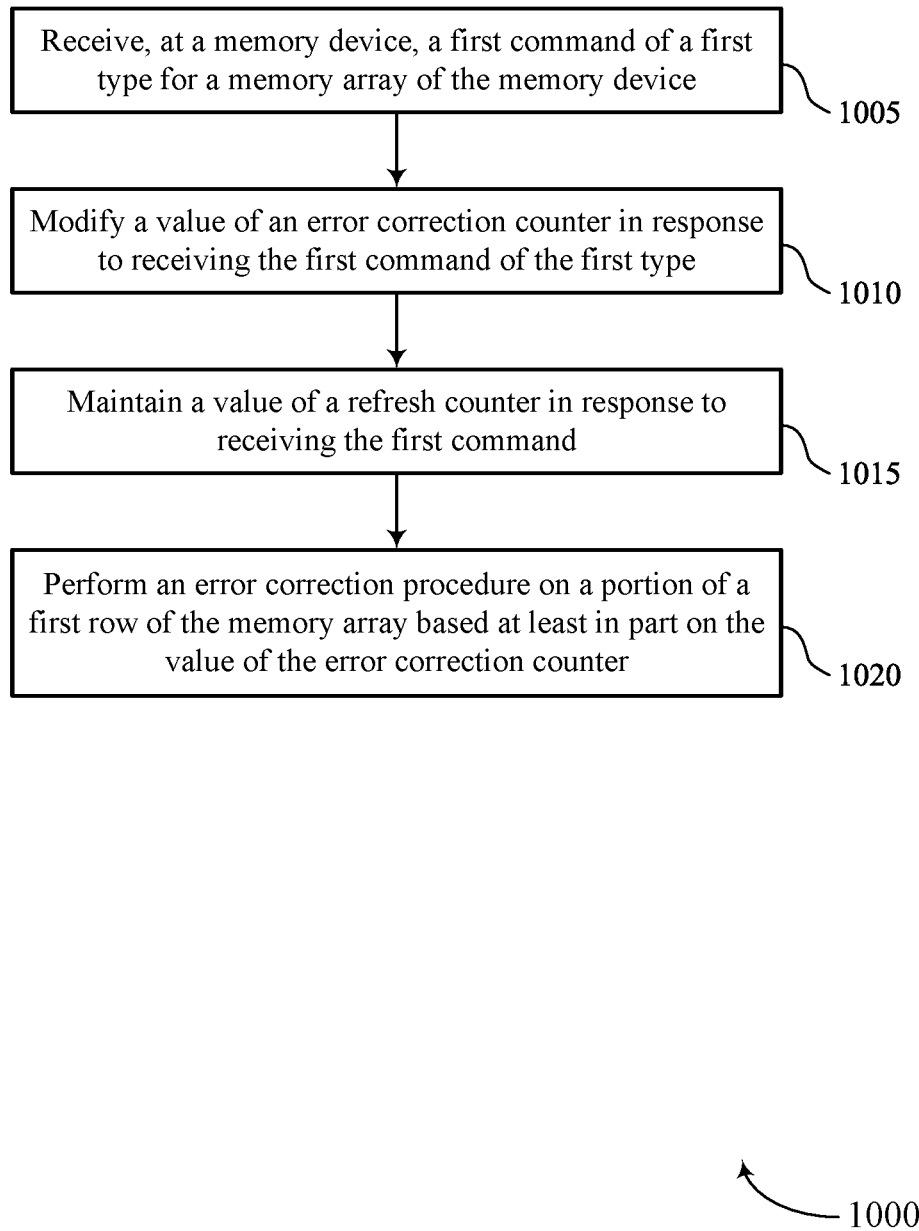
FIGS. 10 and 11 show flowcharts illustrating a method or methods that support techniques for memory error correction in accordance with examples as disclosed herein.

FIG. 10 shows a flowchart illustrating a method 1000 that supports techniques for memory error correction in accordance with examples as disclosed herein. The operations of method 1000 may be implemented by a memory device or its components as described herein. For example, the operations of method 1000 may be performed by a memory device as described with reference to FIGS. 1 through 9. In some examples, a memory device may execute a set of instructions to control the functional elements of the device to perform the described functions. Additionally, or alternatively, the memory device may perform aspects of the described functions using special-purpose hardware.

At 1005, the method may include receiving, at a memory device, a first command of a first type for a memory array of the memory device. The operations of 1005 may be performed in accordance with examples as disclosed herein. In some examples, aspects of the operations of 1005 may be performed by a reception component 925 as described with reference to FIG. 9.

At 1010, the method may include modifying a value of an error correction counter in response to receiving the first command of the first type. The operations of 1010 may be performed in accordance with examples as disclosed herein. In some examples, aspects of the operations of 1010 may be performed by an error correction component 930 as described with reference to FIG. 9.

At 1015, the method may include maintaining a value of a refresh counter in response to receiving the first command. The operations of 1015 may be performed in accordance with examples as disclosed herein. In some examples, aspects of the operations of 1015 may be performed by a refresh component 935 as described with reference to FIG. 9.

At 1020, the method may include performing an error correction procedure on a portion of a first row of the memory array based at least in part on the value of the error correction counter. The operations of 1020 may be performed in accordance with examples as disclosed herein. In some examples, aspects of the operations of 1020 may be performed by an error correction component 930 as described with reference to FIG. 9.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory device, a first command of a first type for a memory array of the memory device; modifying a value of an error correction counter in response to receiving the first command of the first type; maintaining a value of a refresh counter in response to receiving the first command; and performing an error correction procedure on a portion of a first row of the memory array based at least in part on the value of the error correction counter.

Aspect 2: The method, apparatus, or non-transitory computer-readable medium of aspect 1, further including operations, features, circuitry, logic, means, or instructions, or any combination thereof for receiving a second command of a second type; modifying the value of the refresh counter in response to receiving the second command of the second type; maintaining the value of the error correction counter based at least in part on the second command being the second type; and performing a refresh operation on a second row of the memory array based at least in part on the value of the refresh counter.

Aspect 3: The method, apparatus, or non-transitory computer-readable medium of aspect 2, where the value of the refresh counter corresponds to an address for the second row.

Aspect 4: The method, apparatus, or non-transitory computer-readable medium of any of aspects 1 through 3, where maintaining the refresh counter includes operations, features, circuitry, logic, means, or instructions, or any combination thereof for maintaining the refresh counter based at least in part on the first type being a refresh with error correction command.

Aspect 5: The method, apparatus, or non-transitory computer-readable medium of any of aspects 1 through 4, further including operations, features, circuitry, logic, means, or instructions, or any combination thereof for determining, based at least in part on modifying the value of the error correction counter, whether the value of the error correction counter satisfies a threshold and modifying a value of a column counter based at least in part on determining that the value of the error correction counter satisfies the threshold, where the portion of the first row is based at least in part on the value of the column counter.

Aspect 6: The method, apparatus, or non-transitory computer-readable medium of aspect 5, further including operations, features, circuitry, logic, means, or instructions, or any combination thereof for resetting the value of the error correction counter based at least in part on determining that the value of the error correction counter satisfies the threshold.

Aspect 7: The method, apparatus, or non-transitory computer-readable medium of any of aspects 1 through 6, where performing the error correction procedure includes operations, features, circuitry, logic, means, or instructions, or any combination thereof for determining an address associated with the portion of first row based at least in part on a value of a column counter; accessing the first row based at least in part on determining the address; generating one or more parity bits for the portion based at least in part on accessing the first row; and comparing the one or more parity bits for the portion with one or more parity bits previously stored for the portion.

Aspect 8: The method, apparatus, or non-transitory computer-readable medium of any of aspects 1 through 7, further including operations, features, circuitry, logic, means, or instructions, or any combination thereof for determining a size of the portion of the first row based at least in part on a value stored at the memory device.

Aspect 9: The method, apparatus, or non-transitory computer-readable medium of any of aspects 1 through 8, further including operations, features, circuitry, logic, means, or instructions, or any combination thereof for receiving a command to transition to a low power mode for the memory device and issuing, during at least a portion of the low power mode, a second command of the first type from a memory controller of the memory device to the memory array.

Aspect 10: The method, apparatus, or non-transitory computer-readable medium of any of aspects 1 through 9, where the value of the error correction counter corresponds to an address for the first row.

Aspect 11: The method, apparatus, or non-transitory computer-readable medium of any of aspects 1 through 10, where the error correction procedure includes a single error correction (SEC) procedure.

Figure 11:
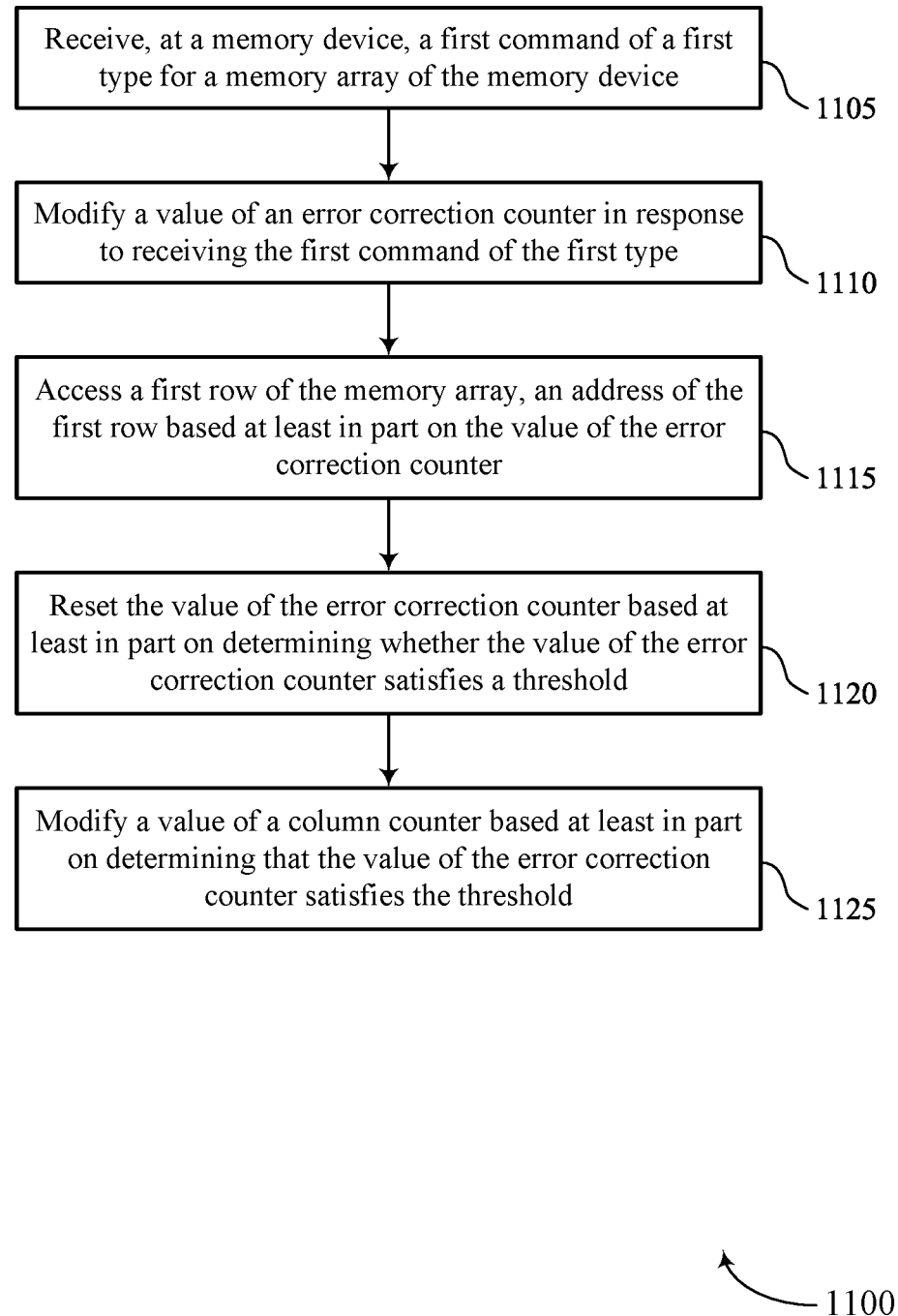

FIG. 11 shows a flowchart illustrating a method 1100 that supports techniques for memory error correction in accordance with examples as disclosed herein. The operations of method 1100 may be implemented by a memory device or its components as described herein. For example, the operations of method 1100 may be performed by a memory device as described with reference to FIGS. 1 through 9. In some examples, a memory device may execute a set of instructions to control the functional elements of the device to perform the described functions. Additionally, or alternatively, the memory device may perform aspects of the described functions using special-purpose hardware.

At 1105, the method may include receiving, at a memory device, a first command of a first type for a memory array of the memory device. The operations of 1105 may be performed in accordance with examples as disclosed herein. In some examples, aspects of the operations of 1105 may be performed by a reception component 925 as described with reference to FIG. 9.

At 1110, the method may include modifying a value of an error correction counter in response to receiving the first command of the first type. The operations of 1110 may be performed in accordance with examples as disclosed herein. In some examples, aspects of the operations of 1110 may be performed by an error correction component 930 as described with reference to FIG. 9.

At 1115, the method may include accessing a first row of the memory array, an address of the first row based at least in part on the value of the error correction counter. The operations of 1115 may be performed in accordance with examples as disclosed herein. In some examples, aspects of the operations of 1115 may be performed by a row access component 940 as described with reference to FIG. 9.

At 1120, the method may include resetting the value of the error correction counter based at least in part on determining whether the value of the error correction counter satisfies a threshold. The operations of 1120 may be performed in accordance with examples as disclosed herein. In some examples, aspects of the operations of 1120 may be performed by an error correction component 930 as described with reference to FIG. 9.

At 1125, the method may include modifying a value of a column counter based at least in part on determining that the value of the error correction counter satisfies the threshold. The operations of 1125 may be performed in accordance with examples as disclosed herein. In some examples, aspects of the operations of 1125 may be performed by a column control component 945 as described with reference to FIG. 9.

In some examples, an apparatus as described herein may perform a method or methods, such as the method 1100. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for receiving, at a memory device, a first command of a first type for a memory array of the memory device; modifying a value of an error correction counter in response to receiving the first command of the first type; accessing a first row of the memory array, an address of the first row based at least in part on the value of the error correction counter; resetting the value of the error correction counter based at least in part on determining whether the value of the error correction counter satisfies a threshold; and modifying a value of a column counter based at least in part on determining that the value of the error correction counter satisfies the threshold.

Aspect 13: The method, apparatus, or non-transitory computer-readable medium of aspect 12, further including operations, features, circuitry, logic, means, or instructions, or any combination thereof for performing an error correction operation on a portion of the first row, an address of the portion of the first row based at least in part on the value of the column counter.

Aspect 14: The method, apparatus, or non-transitory computer-readable medium of any of aspects 12 through 13, further including operations, features, circuitry, logic, means, or instructions, or any combination thereof for receiving a second command of a second type; modifying a value of a refresh counter in response to receiving the second command of the second type; maintaining the value of the error correction counter based at least in part on the second command being the second type; and performing a refresh operation on a second row of the memory array based at least in part on the value of the refresh counter.

Aspect 15: The method, apparatus, or non-transitory computer-readable medium of aspect 14, where the value of the refresh counter corresponds to an address for the second row.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising: a controller associated with a memory device, wherein the controller is configured to cause the apparatus to:
   receive, at the memory device, a first command of a first type for a memory array of the memory device;
   modify a value of an error correction counter in response to receiving the first command of the first type;
   maintain a value of a refresh counter in response to receiving the first command; and
   perform an error correction procedure on a portion of a first row of the memory array based at least in part on the value of the error correction counter.

2. The apparatus of claim 1, wherein the controller is further configured to cause the apparatus to:
   receive a second command of a second type;
   modify the value of the refresh counter in response to receiving the second command of the second type;
   maintain the value of the error correction counter based at least in part on the second command being the second type; and
   perform a refresh operation on a second row of the memory array based at least in part on the value of the refresh counter.

3. The apparatus of claim 2, wherein the value of the refresh counter corresponds to an address for the second row.

4. The apparatus of claim 1, wherein maintaining the refresh counter is configured to cause the apparatus to:
   maintain the refresh counter based at least in part on the first type being a refresh with error correction command.

5. The apparatus of claim 1, wherein the controller is further configured to cause the apparatus to:
   determine, based at least in part on modifying the value of the error correction counter, whether the value of the error correction counter satisfies a threshold; and
   modify a value of a column counter based at least in part on determining that the value of the error correction counter satisfies the threshold, wherein the portion of the first row is based at least in part on the value of the column counter.

6. The apparatus of claim 5, wherein the controller is further configured to cause the apparatus to:
   reset the value of the error correction counter based at least in part on determining that the value of the error correction counter satisfies the threshold.

7. The apparatus of claim 1, wherein performing the error correction procedure is configured to cause the apparatus to:
   determine an address associated with the portion of first row based at least in part on a value of a column counter;
   access the first row based at least in part on determining the address;
   generate one or more parity bits for the portion based at least in part on accessing the first row; and
   compare the one or more parity bits for the portion with one or more parity bits previously stored for the portion.

8. The apparatus of claim 1, wherein the controller is further configured to cause the apparatus to:
   determine a size of the portion of the first row based at least in part on a value stored at the memory device.

9. The apparatus of claim 1, wherein the controller is further configured to cause the apparatus to:
   receive a command to transition to a low power mode for the memory device; and
   issue, during at least a portion of the low power mode, a second command of the first type from a memory controller of the memory device to the memory array.

10. The apparatus of claim 1, wherein the value of the error correction counter corresponds to an address for the first row.

11. The apparatus of claim 1, wherein the error correction procedure comprises a single error correction (SEC) procedure.

12. An apparatus, comprising: a controller associated with a memory device, wherein the controller is configured to cause the apparatus to:

receive, at the memory device, a first command of a first type for a memory array of the memory device;

modify a value of an error correction counter in response to receiving the first command of the first type;

access a first row of the memory array, an address of the first row based at least in part on the value of the error correction counter;

reset the value of the error correction counter based at least in part on determining whether the value of the error correction counter satisfies a threshold; and modify a value of a column counter based at least in part on determining that the value of the error correction counter satisfies the threshold.

13. The apparatus of claim 12, wherein the controller is further configured to cause the apparatus to:

perform an error correction operation on a portion of the first row, an address of the portion of the first row based at least in part on the value of the column counter.

14. The apparatus of claim 12, wherein the controller is further configured to cause the apparatus to:

receive a second command of a second type;

modify a value of a refresh counter in response to receiving the second command of the second type;

maintain the value of the error correction counter based at least in part on the second command being the second type; and perform a refresh operation on a second row of the memory array based at least in part on the value of the refresh counter.

15. The apparatus of claim 14, wherein the value of the refresh counter corresponds to an address for the second row.

16. A non-transitory computer-readable medium storing code, the code comprising instructions executable by a processor to:

receive, at a memory device, a first command of a first type for a memory array of the memory device;

modify a value of an error correction counter in response to receiving the first command of the first type;

maintain a value of a refresh counter in response to receiving the first command; and perform an error correction procedure on a portion of a first row of the memory array based at least in part on the value of the error correction counter.

17. The non-transitory computer-readable medium of claim 16, wherein the instructions are further executable by the processor to:

receive a second command of a second type;

modify the value of the refresh counter in response to receiving the second command of the second type;

maintain the value of the error correction counter based at least in part on the second command being the second type; and perform a refresh operation on a second row of the memory array based at least in part on the value of the refresh counter.

18. The non-transitory computer-readable medium of claim 17, wherein the value of the refresh counter corresponds to an address for the second row.

19. The non-transitory computer-readable medium of claim 16, wherein the instructions to maintain the refresh counter are executable by the processor to:

maintain the refresh counter based at least in part on the first type being a refresh with error correction command.

20. The non-transitory computer-readable medium of claim 16, wherein the instructions are further executable by the processor to:

determine, based at least in part on modifying the value of the error correction counter, whether the value of the error correction counter satisfies a threshold; and modify a value of a column counter based at least in part on determining that the value of the error correction counter satisfies the threshold, wherein the portion of the first row is based at least in part on the value of the column counter.

21. The non-transitory computer-readable medium of claim 20, wherein the instructions are further executable by the processor to:

reset the value of the error correction counter based at least in part on determining that the value of the error correction counter satisfies the threshold.

22. The non-transitory computer-readable medium of claim 16, wherein the instructions to perform the error correction procedure are executable by the processor to:

determine an address associated with the portion of first row based at least in part on a value of a column counter;

access the first row based at least in part on determining the address;

generate one or more parity bits for the portion based at least in part on accessing the first row; and compare the one or more parity bits for the portion with one or more parity bits previously stored for the portion.

23. The non-transitory computer-readable medium of claim 16, wherein the instructions are further executable by the processor to:

determine a size of the portion of the first row based at least in part on a value stored at the memory device.

24. The non-transitory computer-readable medium of claim 16, wherein the instructions are further executable by the processor to:

receive a command to transition to a low power mode for the memory device; and issue, during at least a portion of the low power mode, a second command of the first type from a memory controller of the memory device to the memory array.

25. The non-transitory computer-readable medium of claim 16, wherein the value of the error correction counter corresponds to an address for the first row.

* * * * *